(12) United States Patent
Heeter et al.

(10) Patent No.: US 11,970,985 B1
(45) Date of Patent: Apr. 30, 2024

(54) ADJUSTABLE AIR FLOW PLENUM WITH PIVOTING VANES FOR A FAN OF A GAS TURBINE ENGINE

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Jonathan M. Rivers, Indianapolis, IN (US); Michael S. Krautheim, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/234,654

(22) Filed: Aug. 16, 2023

(51) Int. Cl.
| | |
|---|---|
| *F01D 17/14* | (2006.01) |
| *F02C 9/22* | (2006.01) |
| *F04D 29/52* | (2006.01) |
| *F04D 29/54* | (2006.01) |
| *F04D 29/68* | (2006.01) |

(52) U.S. Cl.
CPC .............. *F02C 9/22* (2013.01); *F01D 17/141* (2013.01); *F04D 29/526* (2013.01); *F04D 29/542* (2013.01); *F04D 29/68* (2013.01)

(58) Field of Classification Search
CPC . F02C 9/22; F01D 17/141; F02K 3/06; F04D 29/542; F04D 29/526; F05D 2220/36; F05D 2240/12; F05D 2240/14
See application file for complete search history.

(56) References Cited

U.S. PATENT DOCUMENTS

| | | | |
|---|---|---|---|
| 4,086,022 A | 4/1978 | Freeman et al. | |
| 5,137,419 A | 8/1992 | Waterman | |
| 5,282,718 A * | 2/1994 | Koff ...................... | F04D 29/685 |
| | | | 415/58.7 |
| 5,607,284 A * | 3/1997 | Byrne ................... | F04D 29/526 |
| | | | 415/58.7 |
| 5,762,470 A | 6/1998 | Gelmedov et al. | |
| 6,231,301 B1 | 5/2001 | Barnett et al. | |
| 6,409,470 B2 | 6/2002 | Allford et al. | |
| 6,497,551 B1 | 12/2002 | Hand et al. | |
| 6,514,039 B1 | 2/2003 | Hand | |
| 6,619,909 B2 | 9/2003 | Barnett et al. | |
| 6,648,591 B2 | 11/2003 | Collins | |
| 6,685,426 B2 | 2/2004 | Clark | |

(Continued)

FOREIGN PATENT DOCUMENTS

| | | |
|---|---|---|
| CN | 113217469 A | 8/2021 |
| DE | 102007056953 | 10/2015 |

(Continued)

*Primary Examiner* — Courtney D Heinle
*Assistant Examiner* — Theodore C Ribadeneyra
(74) *Attorney, Agent, or Firm* — Barnes & Thornburg LLP

(57) ABSTRACT

A gas turbine engine includes a fan and a fan case assembly. The fan includes a fan rotor configured to rotate about an axis of the gas turbine engine and a plurality of fan blades coupled to the fan rotor for rotation therewith. The fan case assembly extends circumferentially around the plurality of fan blades radially outward of the plurality of the fan blades.

20 Claims, 7 Drawing Sheets

(56) References Cited

U.S. PATENT DOCUMENTS

| | | |
|---|---|---|
| 6,736,594 B2 | 5/2004 | Irie et al. |
| 6,832,890 B2 | 12/2004 | Booth |
| 6,905,305 B2 | 6/2005 | James |
| 6,935,833 B2 | 8/2005 | Seitz |
| 7,186,072 B2 | 3/2007 | Seitz |
| 7,210,905 B2 | 5/2007 | Lapworth |
| 7,575,412 B2 | 8/2009 | Seitz |
| 8,257,022 B2 | 9/2012 | Guemmer |
| 8,419,355 B2 | 4/2013 | Guemmer et al. |
| 8,602,720 B2 | 12/2013 | Goswami et al. |
| 8,845,269 B2 | 9/2014 | Agneray et al. |
| 8,915,699 B2 | 12/2014 | Brignole et al. |
| 9,638,213 B2 | 5/2017 | Obrecht et al. |
| 9,651,060 B2 | 5/2017 | Morel et al. |
| 9,957,976 B2 | 5/2018 | Allford |
| 10,024,336 B2 | 7/2018 | Obrecht et al. |
| 10,047,620 B2 | 8/2018 | Giacche et al. |
| 10,378,550 B2 | 8/2019 | Lim et al. |
| 10,450,869 B2 | 10/2019 | Brignole et al. |
| 10,539,154 B2 | 1/2020 | Mallina et al. |
| 11,078,805 B2 | 8/2021 | Joly et al. |
| 11,092,030 B2 | 8/2021 | Joly et al. |
| 11,131,322 B2 | 9/2021 | Grothe et al. |
| 11,293,293 B2 * | 4/2022 | Zha ............ F04D 29/685 |
| 11,473,438 B2 | 10/2022 | Reynolds et al. |
| 11,572,897 B1 | 2/2023 | Duong et al. |
| 2007/0147989 A1 | 6/2007 | Collins |
| 2008/0044273 A1 | 2/2008 | Khalid |
| 2012/0315131 A1 | 12/2012 | Mertens |

FOREIGN PATENT DOCUMENTS

| | | |
|---|---|---|
| EP | 2434164 | 3/2012 |
| EP | 3081779 | 10/2016 |
| JP | 2003227497 A | 8/2003 |
| KR | 200930757 A | 3/2009 |

\* cited by examiner

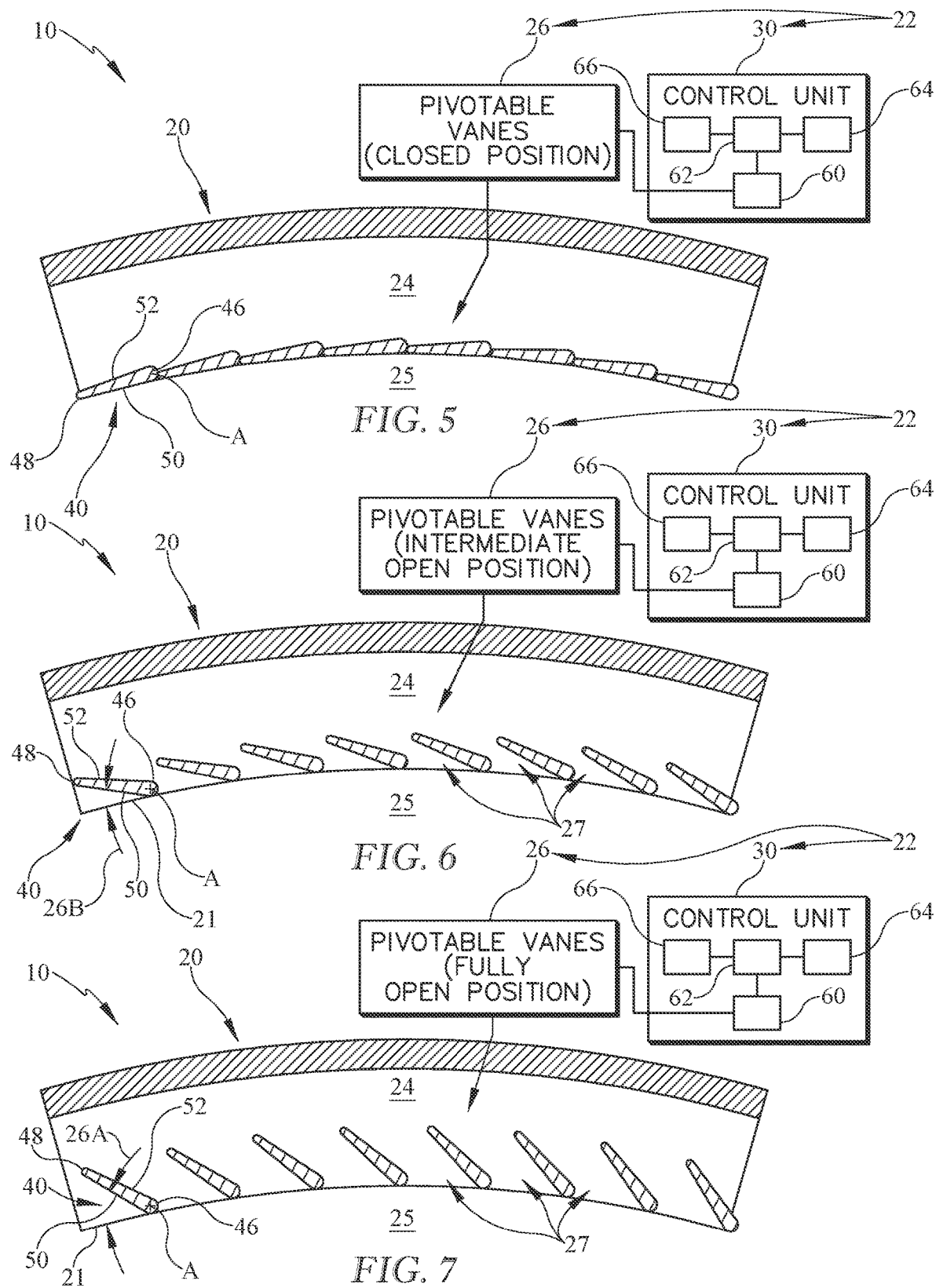

ADJUSTABLE AIR FLOW PLENUM WITH PIVOTING VANES FOR A FAN OF A GAS TURBINE ENGINE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof.

A fan case assembly may be adapted for use with a gas turbine engine. The fan case assembly may include a case, a plurality of vanes, and a control unit.

In some embodiments, the case may extend circumferentially at least partway about an axis to define an outer boundary of a gas path of the gas turbine engine. The case may be formed to define a plenum. The plenum may extend circumferentially at least partway about the axis and open to the gas path of the gas turbine engine.

In some embodiments, the plurality of vanes may be pivotably coupled to the case in the plenum to pivot about a pivot axis between a closed position and a fully open position. In the closed position, each vane may cooperate with an inner surface of the case to define the outer boundary of the gas path to block fluid communication between the gas path and the plenum. In the fully open position, each vane may be at a maximum angle relative to the gas path to provide an opening to allow fluid communication between the gas path of the gas turbine engine and the plenum.

In some embodiments, the control unit may be coupled to the plurality of vanes. The control unit may be configured to move each vane of the plurality of vanes between the closed position and the fully open position in response to preselected operating conditions to minimize negative effects of pressure and swirl distortions in the gas turbine engine to improve stall margin for the gas turbine engine.

In some embodiments the plurality of vanes may be each configured to pivot relative to the case to a plurality of intermediate open positions between the closed position and the fully open position. In the intermediate open position, each vane of the plurality of vanes may be at an intermediate angle relative to the gas path that is less than the maximum angle to vary the fluid communication between the gas path of the gas turbine engine and the plenum.

In some embodiments, each vane of the plurality of vanes includes an airfoil and a pair of pegs. The pair of pegs may be coupled to the airfoil.

In some embodiments, the airfoil may have a pivot end, a trailing end, a first side surface, and a second side surface. The trailing end may be spaced apart circumferentially from the pivot end. The first side surface may extend between and interconnect the pivot end and the trailing end. The first side surface may face the gas path of the gas turbine engine. The second side surface may be opposite the first side surface and may extend between and interconnect the pivot end and the trailing end. The second side surface may face the plenum. The pair of pegs may extend from the airfoil near the pivot end to the case to couple the respective vane to the case.

In some embodiments, the plurality of vanes includes a first set of vanes and a second set of vanes. The first set of vanes may be configured to pivot in a first direction about the pivot axis from the closed position to the open position. The second set of vanes may be configured to pivot in a second direction about the pivot axis opposite the first direction from the closed position to the open position.

In some embodiments, the first set of vanes may be arranged in series. The second set of vanes may be arranged in series and may be spaced apart circumferentially from the first set of vanes. In some embodiments, the first set of vanes may be alternated circumferentially between the second set of vanes.

In some embodiments, the control unit includes at least one actuator and a controller. The actuator may be coupled to the plurality of vanes. The actuator may be configured to drive movement of the plurality of vanes between the closed position and the fully open position.

In some embodiments, the controller may be coupled to at least one actuator. The controller may be configured to direct at least one actuator to move the plurality of vanes to the closed position when the gas turbine engine is in a cruise condition included in the preselected operating conditions.

In some embodiments, the control unit further includes a memory. The memory may be coupled to the controller. The memory may include a plurality of preprogrammed aircraft maneuvers that each correspond to one of the closed position and the fully open position.

In some embodiments, the controller may be configured to detect a preprogrammed aircraft maneuver included in the plurality of preprogrammed aircraft maneuvers on the memory. The controller may be configured to direct at least one actuator to move the plurality of vanes to a corresponding position in response to detecting the preprogrammed aircraft maneuver.

In some embodiments, the control unit may further include at least one sensor. The sensor may be coupled to the controller. The sensor may be configured to measure one of pressure, air speed, altitude, blade tip timing, blade rotational speed, attitude, and acceleration.

In some embodiments, the controller may be configured to receive a measurement from the at least one sensor. The controller may direct at least one actuator to move the plurality of vanes to a corresponding position in response to the measurement of the at least one sensor.

According to another aspect of the present disclosure, gas turbine engine may include a fan and a fan case assembly. The fan may include a fan rotor and a plurality of fan blades. The fan rotor may be configured to rotate about an axis of the gas turbine engine. The plurality of fan blades may be coupled to the fan rotor for rotation therewith.

In some embodiments, the fan case assembly may extend circumferentially around the plurality of fan blades radially outward of the plurality of fan blades. The fan case assembly may include a case, a plurality of vanes, and a control unit.

In some embodiments, the case may extend circumferentially at least partway about the axis. The case may be formed to define a plenum. The plenum may extend circumferentially at least partway about the axis. The plenum may be open to a gas path of the gas turbine engine.

In some embodiments, the plurality of vanes may be pivotably coupled to the case in the plenum to pivot about a pivot axis. The plurality of vanes may pivot between a closed position and a fully open position. In the closed position, each vane may cover a portion of the plenum to block fluid communication between the gas path and the plenum. In the fully open position, each vane may be at a maximum angle relative to the gas path to provide an opening to allow fluid communication between the gas path of the gas turbine engine and the plenum.

In some embodiments, the control unit may be coupled to the plurality of vanes. The control unit may be configured to move each vane of the plurality of vanes between a closed position and a fully open position in response to preselected operating conditions.

In some embodiments, the plurality of vanes may be each configured to pivot relative to the case. The plurality of vanes may pivot to a plurality of intermediate open positions between the closed position and the fully open position. Each vane of the plurality of vanes may be at an intermediate angle relative to the gas path that is less than the maximum angle to vary the fluid communication between the gas path of the gas turbine engine and the plenum.

In some embodiments, each vane of the plurality of vanes may include an airfoil and a pair of pegs. The pair of pegs may be coupled to the airfoil.

In some embodiments, the airfoil may have a pivot end, a trailing end, a first side surface, and a second side surface. The trailing end may be spaced apart circumferentially from the pivot end. The first side surface may extend between and interconnect the pivot end. The first side surface may face the gas path of the gas turbine engine. The second side surface may be opposite the first side surface and may extend between and interconnect the pivot end and the trailing end. The second side surface may face the plenum. The pair of pegs may extend from the airfoil near the pivot end to the case to couple the respective vane to the case.

In some embodiments, the plurality of vanes may include a first set of vanes and a second set of vanes. The first set of vanes may be configured to pivot in a first direction about the pivot axis from the closed position to the open position. The second set of vanes may be configured to pivot in a second direction about the pivot axis opposite the first direction from the closed position to the open position.

In some embodiments, the first and second set of vanes may be arranged in series. The second set of vanes may be spaced apart circumferentially from the first set of vanes. In some embodiments, the first set of vanes may be alternated circumferentially between the second set of vanes.

In some embodiments, the control unit may include at least one actuator and a controller. The actuator may be coupled to the plurality of vanes. The actuator may be configured to drive movement of the plurality of vanes between the closed position and the fully open position.

In some embodiments, the controller may be coupled to at least one actuator. The controller may configured to direct at least one actuator to move the plurality of vanes to the closed position when the gas turbine engine is in a cruise condition included in the preselected operating conditions.

In some embodiments, the control unit may further include a memory. The memory may be coupled to the controller. The memory may include a plurality of preprogrammed aircraft maneuvers that each correspond to one of the closed position and the fully open position.

In some embodiments, the controller may configured to detect a preprogrammed aircraft maneuver included in the plurality of preprogrammed aircraft maneuvers on the memory. The controller may be configured to direct the at least one actuator to move the plurality of vanes to a corresponding position. The position may be in response to detecting the preprogrammed aircraft maneuver.

In some embodiments, the control unit further includes at least one sensor. The sensor may be coupled to the controller. The sensor may be configured to measure one of pressure, air speed, altitude, blade tip timing, blade rotational speed, attitude, and acceleration.

In some embodiments, the controller may be configured to receive a measurement from the at least one sensor. The controller may be configured to direct at least one actuator to move the plurality of vanes to a corresponding position in response to the measurement of the at least one sensor.

According to another aspect of the present disclosure, a method may include providing a fan case assembly. The fan case assembly may be adapted for use with a gas turbine engine.

In some embodiments, the fan case assembly may include a case and a plurality of vanes. The case may extend circumferentially at least partway about an axis of the gas turbine engine. The case may be formed to define a plenum that extends circumferentially at least partway about the axis. The plurality of vanes may be pivotably coupled to the case in the plenum to pivot about a pivot axis relative to the case.

In some embodiments, the method may further include locating the plurality of vanes in a closed position. In the closed position, each vane may cover a portion of the plenum to block fluid communication between the gas path and the plenum.

In some embodiments, the method may further include pivoting the plurality of vanes to a fully open position. In the fully open position, each vane may be at a maximum angle relative to a gas path of the gas turbine engine to provide an opening to allow fluid communication between the gas path of the gas turbine engine and the plenum in response to one preselected operating condition included in a plurality of preselected operating conditions.

These and other features of the present disclosure will become more apparent from the following description of the illustrative embodiments.

BRIEF DESCRIPTION OF THE DRAWINGS

FIG. 5 is a cross-section view of the fan case assembly of FIG. 3 with the plurality of vanes in the closed position in which each vane cooperates with an inner surface of the case to define the outer boundary of the gas path thereby covering the plenum to block fluid communication between the gas path and the plenum FIG. 6 is a cross-section view of the fan case assembly of FIG. 3 with the plurality of vanes in one of the intermediate open positions included in a plurality of intermediate open positions between the closed position and the fully open position in which the each vane is at an intermediate angle relative to the gas path to partially open the plenum to the gas path so as to vary the fluid communication between the gas path of the gas turbine engine and the plenum;

FIG. 7 is a cross-section view of the fan case assembly of FIG. 3 with the plurality of vanes in the fully open position in which each vane is at a maximum angle relative to the gas path to provide the maximum fluid communication between the gas path of the gas turbine engine and the plenum;

DETAILED DESCRIPTION OF THE DRAWINGS

Figures 1, 2:
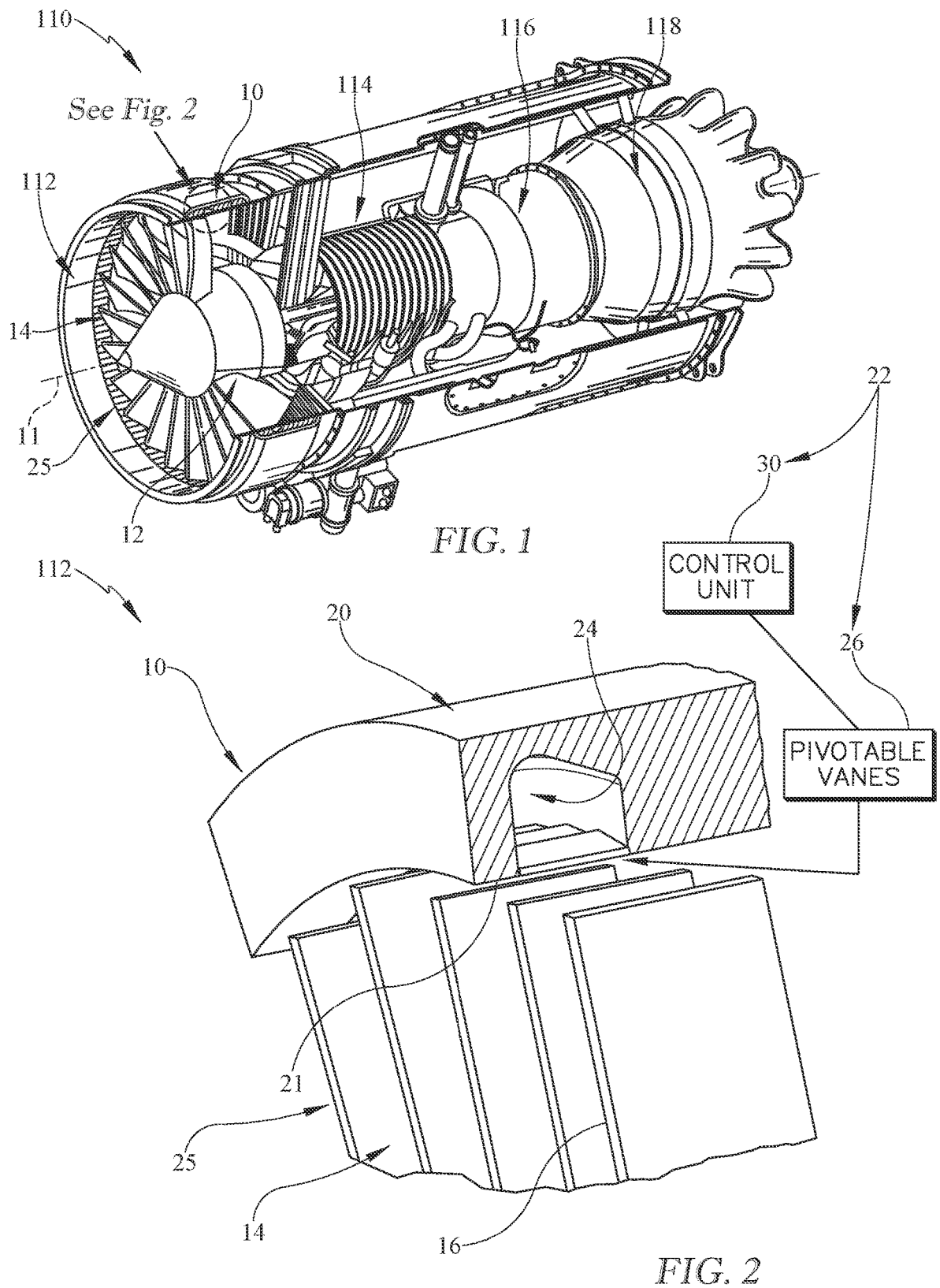
FIG. 1 is a cutaway view of a gas turbine engine that includes a fan, a compressor, a combustor, and a turbine, the fan including fan rotor configured to rotate about an axis of the engine and a fan case assembly that surrounds fan blades included in the fan rotor.
FIG. 2 is a detail view of the fan case assembly included in the gas turbine engine of FIG. 1 showing that the fan case assembly includes a case that extends circumferentially at least partway about an axis of the engine radially outward of the fan blades to define an outer boundary of a gas path of the gas turbine engine, a plurality of vanes pivotably coupled to the case in the plenum to pivot about a pivot axis between a closed position as shown in FIG. 5, an intermediate open position as shown in FIG. 6, and a fully open position as shown in FIG. 7, and a control unit configured to move each vane of the plurality of vanes between the different positions in response to preselected operating conditions to minimize negative effects of pressure and swirl distortions in the gas turbine engine to improve stall margin.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

Figure 3:
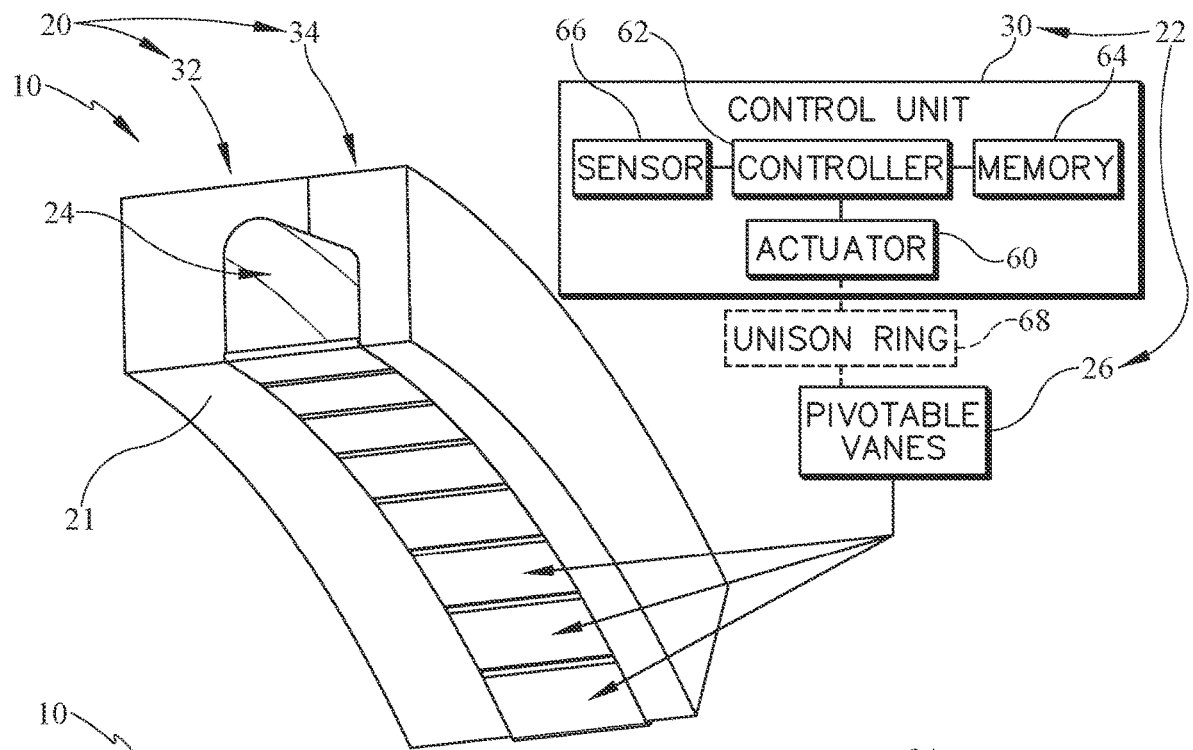
FIG. 3 is a perspective view of the fan case assembly of FIG. 2 showing the plurality of vanes are spaced apart circumferentially about the axis.
Figure 4:
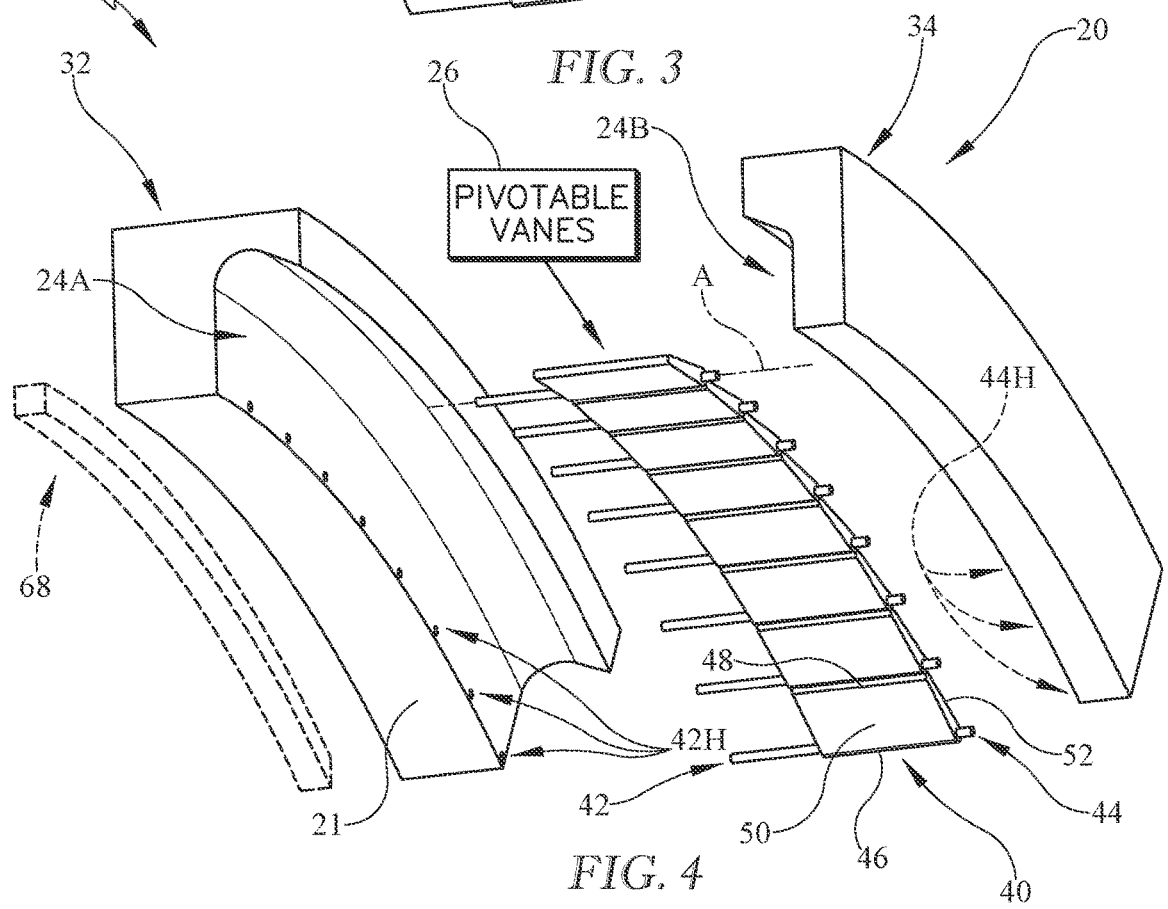
FIG. 4 is an exploded view of FIG. 3 showing the case includes a forward section and an aft section configured to be coupled to the forward section to trap the plurality of vanes axially therebetween in the plenum, and further showing each of the vanes includes an airfoil and a pair of pegs that extend axially from the airfoil to fit into peg holes formed in the forward and aft sections of the case.

The fan case assembly 10 includes, among other components, a case 20 and an inlet distortion mitigation system 22 as shown in FIGS. 2-4. The case 20 extends circumferentially at least partway about the axis 11 to define an outer boundary of a gas path 25 of the gas turbine engine 110. The case 20 is formed to define a plenum 24 that extends circumferentially at least partway about the axis 11 and is open to the gas path 25 of the gas turbine engine 110. The inlet distortion mitigation system 22 is configured to control fluid communication between the plenum 24 and the gas path 25 of the gas turbine engine 110.

The inlet distortion mitigation system 22 includes a plurality of pivotable vanes 26 and a control unit 30 as shown in FIGS. 2-4. The plurality of vanes 26 are pivotably coupled to the case 20 in the plenum 24 to pivot about a pivot axis A. The plurality of vanes 26 are configured to pivot between a closed position as shown in FIG. 5, a plurality of intermediate open positions as shown in FIG. 6, and a fully open position as shown in FIG. 7. The control unit 30 is configured to move the plurality of vanes 26 between the different positions in response to preselected operating conditions to control fluid communication between the plenum 24 and the gas path 25 so as to minimize the negative effects of pressure and swirl distortions in the gas turbine engine 110 to improve stall margin for the gas turbine engine 110.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin or to be able to more evenly distribute flows. Attempting to solve the worst stall condition while maintaining performance over all of the cycles or flight conditions may be difficult and result in compromised efficiency or a limited flight envelope.

Therefore, the fan case assembly 10 includes the inlet distortion mitigation system 22 which includes the plurality of vanes 26 that pivot relative to the case 20 to control fluid communication between the plenum 24 and the gas path 25. In this way, the negative effects of pressure and swirl distortions are minimized to improve stall margin. The negative effects may include loss of efficiency or overall performance of the engine 110 and/or other negative operating conditions known to one of ordinary skill in the art.

In the closed position, each vane 26 cooperates with an inner surface of the case 20 to define the outer boundary of the gas path 25 to block fluid communication between the gas path 25 and the plenum 24 as shown in FIG. 5. Each of the vanes 26 forms a part of the outer boundary of the gas path 25 thereby covering any opening of the plenum 24 to block fluid communication between the gas path 25 and the plenum 24 when each of the vanes 26 are in the closed position.

In the fully open position, each vane 26 is at a maximum angle 26A relative to the gas path 25 to provide an opening 27 to allow fluid communication between the gas path 25 of the gas turbine engine 110 and the plenum 24. This permits air pressure and flows to better equalize circumferentially to improve stall margin.

The plurality of intermediate open positions are between the closed position and the fully open position. In any one of the intermediate open positions, each vane 26 is at an intermediate angle 26B relative to the gas path 25 as shown in FIG. 6. The intermediate angle 26B is less than the maximum angle 26A so as to modulate the size of the opening 27 thereby varying the fluid communication between the gas path 25 of the gas turbine engine 110 and the plenum 24.

The control unit 30 is configured to pivot the vanes 26 between the different positions in response to preselected operating conditions. The preselected operating conditions include a plurality of preprogrammed aircraft maneuvers stored on a memory 64 included in the control unit 30. The plurality of preprogrammed aircraft maneuvers include banks, turns, rolls, etc.

The control unit 30 is configured to detect a preprogrammed aircraft maneuver included in the plurality of preprogrammed aircraft maneuvers on the memory 64. Once the preprogrammed aircraft maneuver is detected, the control unit 30 directs each of the vanes 26 to pivot to a corresponding position in response to detecting the preprogrammed aircraft maneuver.

For example, the plurality of vanes 26 may normally be in the closed position during a cruise condition so that no additional stall margin is created, but performance is not compromised. The cruise condition included in the preselected operating conditions corresponds when the aircraft is in the cruise portion of the flight cycle.

Then, when the control unit 30 detects a preprogrammed aircraft maneuver, i.e. banks, turns, rolls, the control unit 30 directs the vanes 26 to pivot to one of the intermediate open positions or the fully open position so that flow is permitted into the plenum 24. This permits air pressure and flows to better equalize circumferentially around the fan 112 thereby minimizing the negative effects of pressure and swirl distortions to improve stall margin.

The control unit 30 is configured to direct some or all of the vanes 26 to pivot from the closed position to one of the intermediate open positions or the fully open position based on the detected preprogrammed aircraft maneuver. Depending on the preprogrammed aircraft maneuver, the control unit 30 may direct only certain vanes 26 to move to one of the intermediate open positions or the fully open position, while keeping others in the closed position.

Additionally, the control unit 30 may direct some of the vanes 26 to remain in the closed position, while directing some of the vanes 26 to pivot to the fully opened position and others to an intermediate open position. The control unit 30 is configured to direct some of the vanes 26 to pivot to one intermediate open position while others are pivoted to another intermediate open position. In other words, the control unit 30 is configured to individual vary the angle of each of the vanes 26.

The preselected operating conditions may further include a sensor input from at least one sensor 66 included in the control unit 30. The sensor 66 is configured to measure one of pressure, air speed, altitude, blade tip timing, blade rotational speed, attitude or aircraft orientation, and acceleration. In some embodiments, the control unit 30 includes a plurality of sensors 66 each configured to measure one of pressure, air speed, and acceleration.

The control unit 30 is configured to receive a measurement from the at least one sensor 66 or sensors 66 and direct the vanes 26 to pivot to a corresponding position in response to the measurement of the at least one sensor 66. The control unit 30 may be configured to direct the vanes 26 to be in the closed position when the measurements from the sensor 66 are within a predetermined threshold.

Then, when the measurement from the sensor 66 is outside of the predetermined threshold, the control unit 30 directs the vanes 26 to pivot to one of the intermediate open positions or the open position. Based on the difference of the measurement from the sensor 66 compared to the predetermined threshold, the control unit 30 may vary the position of the vanes 26 to control the amount of fluid communication between the gas path 25 and the plenum 24 through the openings 27 formed by the vanes 26.

The control unit 30 is configured to direct some or all of the vanes 26 to pivot from the closed position to one of the intermediate open positions or the fully open position based on the measurement from the sensor 66. The control unit 30 may direct some of the vanes 26 to remain in the closed position, while directing some of the vanes 26 to pivot to the fully opened position and others to an intermediate open position based on the measurement from the sensor 66.

In some embodiments, the control unit 30 may be configured to use a combination of the sensor measurements and the detected preprogrammed aircraft maneuver to control the position of the plurality of vanes 26. For example, when the control unit 30 detects a preprogrammed aircraft maneuver and the measurement is outside of the predetermined threshold, the control unit 30 directs some or all of the vanes 26 to pivot to one of the intermediate open positions or the fully open position. The control unit 30 is configured to direct some of the vanes 26 to pivot to one intermediate open position while others are pivoted to another intermediate open position. The control unit 30 is configured to individual vary the angle of each of the vanes 26.

In some embodiments, the control unit 30 is configured to use the measurements from the sensor 66 to anticipate the aircraft maneuver. The control unit 30 is configured to direct some or all of the plurality of vanes 26 to move to one of the intermediate open positions or the open position in response to the measurement from the sensor 66 even though no preprogrammed aircraft maneuver is detected.

Alternatively, there may be a delay in the measurements from the sensor 66. Therefore, the control unit 30 is also configured to direct some or all of the vanes 26 to move to one of the intermediate open positions or the open position when the one of the preprogrammed aircraft maneuvers is detected, even though the measurements from the sensor 66 are within the predetermined thresholds.

In some embodiments, the control unit 30 may detect one of the preprogrammed aircraft maneuvers, but the measurements from the sensors 66 are within the predetermined threshold. If so, the control unit 30 may direct some or all of the vanes 26 to remain in the current position.

Turning again to the fan case assembly 10, the fan case assembly 10 extends circumferentially at least partway about the axis 11 in the illustrative embodiment. In some embodiments, the fan 112 may include multiple fan case assemblies 10 arranged circumferentially about the axis 11 to form a full hoop. In other embodiments, the fan case assembly 10 may be annular and extends circumferentially about the axis 11. In some embodiments, the case 20 may extend around the axis 11, while the plenum 24 only extends partway about the axis 11.

In some embodiments, the fan 112 may include multiple fan case assemblies 10 spaced apart circumferentially about the axis 11 to define segments between each fan case assembly 10. The segments between the fan case assemblies 10 does not have a plenum 24 so that the plenums 24 of each of the fan case assemblies 10 are independent from each other.

The case 20 includes a forward section 32 and an aft section 34 as shown in FIG. 4. The aft section 34 is configured to be coupled to the forward section 32 to trap the plurality of vanes 26 axially therebetween in the plenum 24.

The forward section 32 is formed to define a forward portion 24A of the plenum 24, while the aft section 34 is formed to define an aft portion 24B of the plenum 24 in the illustrative embodiment. The plurality of vanes 26 extend axially across the plenum 24 so that the vanes 26 are in both the forward and aft portions 24A, 24B of the plenum 24.

The plenum 24 is formed in the case 20 so that the plenum 24 is located at a leading edge 16 of each of the fan blades 14 as shown in FIG. 2. In the illustrative embodiment, the plenum 24 has a forward-leaning cross-sectional shape as shown in FIGS. 2 and 3. In other embodiments, the plenum 24 may have another cross-sectional shape.

In some embodiments, the case 20 may be formed to include a stop member for each of the vanes 26. The stop member may extend from the case 20 into the plenum 24 at or near the inner surface 21 of the case 20 to block the vanes 26 from over rotating into the gas path 25. In some embodiments, the case 20 may include a plurality of discrete members for each of the vanes 26. In other embodiments, the step member may be a lip that extends circumferentially along the case 20 to define a portion of the inner surface 21. In some embodiments, each section 32, 34 of the case 20 may have a lip that extends circumferentially.

The inlet distortion mitigation system 22 includes the plurality of vanes 26 and the control unit 30 as shown in FIGS. 2-4. Each of the vanes 26 includes an airfoil 40 and a pair of pegs 42, 44 as shown in FIG. 4.

The airfoil 40 of each vane 26 has a pivot end 46, a trailing end 48, a first side surface 50, and a second side surface 52 as shown in FIGS. 4-7. The pivot end 46 is coupled to the case 20 to be the pivot point of the vane 26. The trailing end 48 is spaced apart circumferentially from the pivot end 46. The first and second side surfaces 50, 52 each extend between and interconnect the pivot end 46 and the trailing end 48. In the illustrative embodiment, the first side surface 50 faces the gas path 25 and the second side surface 52 that faces the plenum 24 when the vane 26 is in the closed position.

In the illustrative embodiment, the vanes 26 are coupled to the case 20 so that the trailing end 48 of one vane 26 is adjacent to the pivot end 46 of the adjacent vane 26 as shown in FIG. 4. The vanes 26 are spaced apart circumferentially so that the pivot end 46 of one vane 26 is adjacent to the trailing end 48 of the adjacent vane 26. The trailing end 48 is pivoted away from the pivot end 46 of the adjacent vane 26 to provide the opening 27 as shown in FIGS. 6 and 7.

The pair of pegs 42, 44 each extend from the airfoil 40 near the pivot end 46 to the case 20 to couple the respective vane 26 to the case 20. The pair of pegs 42, 44 extend axially from the airfoil 40 to fit into peg holes 42H, 44H formed in the forward and aft sections 32, 34 of the case 20.

In the illustrative embodiment, one of the pegs 42 on each vane 26 is longer compared to the peg 44 on the other side as suggested in FIG. 4. The peg 42 is longer to extend through the case 20 and attach to the unison ring 68, while the other is shorter to provide support.

The vanes 26 are pivotable between the closed position and the fully open position to change the angle of the vanes 26 relative to the gas path 25. In the closed position, the angle of each vane 26 is zero degrees. In the fully open position, each vane 26 is at the maximum angle 26A. In any one of the intermediate open positions, each vane 26 is at an intermediate angle 26B that is less than the maximum angle 26A.

In the illustrative embodiment, the maximum angle 26A is about 45 degrees. In some embodiments, the maximum angle 26A may be greater than 45 degrees. In some embodiments, the maximum angle 26A may be less than 45 degrees.

In the illustrative embodiment, the plurality of vanes 26 are configured to pivot in a first direction about the pivot axis A from the closed position to one of the intermediate open positions or the fully open position as shown in FIGS. 6 and 7. The vanes 26 are configured to pivot in a second direction about the pivot axis A opposite the first direction to go back to the closed position.

In some embodiments, each of the vanes 26 may be configured to pivot 180 degrees about the pivot axis A. The plurality of vanes 26 may configured to pivot in the first direction 180 degrees about the pivot axis A from the closed position to another closed position with the vanes 26 flipped. The plurality of vanes 26 may configured to pivot in the second direction 180 degrees about the pivot axis A from the closed position back to the original closed position with the vanes 26.

The control unit 30 may be configured to pivot the some of the vanes 26 more than 90 degrees about the pivot axis A, while pivoting other vanes 26 less than 90 degrees about the pivot axis A. This would allow some of the vanes 26 to open the openings 27 for flow into the plenum 24, while the vanes 26 pivoted over 90 degrees to open the openings 27 for flow out of the plenum 24.

The control unit 30 includes at least one actuator 60, a controller 62, a memory 64, and at least one sensor 66 as shown in FIGS. 2-4. The actuator 60 is coupled to vanes 26. The actuator 60 is configured to drive the pivoting motion of the vanes 26. The controller 62 is coupled to the actuator 60 to direct the actuator 60 to pivot the vanes 26 between the different positions.

The actuator 60 is configured to pivot the vanes 26 between the closed position as shown in FIG. 5, the plurality of intermediate open positions as shown in FIG. 6, and the fully open position as shown in FIG. 7. The controller 62 is configured to direct the actuator 60 to pivot the vanes 26 between the different positions in response to preselected operating conditions. The preselected operating conditions include the plurality of preprogrammed aircraft maneuvers stored on the memory 64 included in the control unit 30.

The controller 62 of the control unit 30 is configured to detect a preprogrammed aircraft maneuver included in the plurality of preprogrammed aircraft maneuvers on the memory 64. Once the preprogrammed aircraft maneuver is detected, the controller 62 directs the actuator 60 to pivot some or all of the vanes 26 to a corresponding position in response to detecting the preprogrammed aircraft maneuver.

In some embodiment, the actuator 60 may be coupled to a unison ring 68 included in the fan case assembly 10. The unison ring 68 is coupled to the vanes 26 as suggested in FIG. 4. The unison ring 68 is coupled to the vanes 26 to link movement of the vanes 26 together so that when the controller 62 directs the actuator 60 to pivot the vanes 26, the actuator 60 moves the unison ring 68 to simultaneously pivot the plurality of vanes 26 to the desired position.

In some embodiments, the control unit 30 may include multiple unison rings 68 that couple different sets of vanes 26 together. The control unit 30 may include multiple actuators 60 each coupled to a respective unison ring 68 to control the positions of the vanes 26 in groups so that some of the vanes 26 move together in unison, while other vanes 26 are independently controlled from the first group.

In some embodiments, the control unit 30 includes a separate actuator 60 for each vane 26. Each actuator 60 is coupled to one of the respective vanes 26. In this way, the controller 62 independently controls the position of each of the vanes 26.

In some embodiments, the actuator 60 may include pneumatic or electric actuators, or combinations of hydraulic, pneumatic, and electric. Any other actuator known to a person skilled in the art could be utilized as well.

The controller 62 of the control unit 30 is configured to direct the actuator(s) 60 to pivot some or all of the vanes 26 from the closed position to one of the intermediate open positions or the fully open position based on the detected preprogrammed aircraft maneuver. Depending on the preprogrammed aircraft maneuver, the controller 62 of the control unit 30 may direct certain actuators 60 to only pivot certain vanes 26 to one of the intermediate open positions or the fully open position, while keeping others in the closed position.

Additionally, the controller 62 of the control unit 30 may direct the actuator(s) 60 to keep some of the vanes 26 to in the closed position, while pivoting some of the vanes 26 to the fully opened position and others to an intermediate open position. The controller 62 of the control unit 30 is configured to direct the actuator(s) 60 to pivot some of the vanes 26 to one intermediate open position while pivoting others to another intermediate open position. In other words, the control unit 30 is configured to individual vary the angle of each of the vanes 26.

The preselected operating conditions may further include a sensor input from the sensor 66 or sensors 66 included in the control unit 30. The sensor 66 is configured to measure one of pressure, air speed, and acceleration. The sensor 66 is also configured to detect distortion, fan stall, and/or other aeromechanical issues. In some embodiments, the control unit 3 includes a plurality of sensors 66 each configured to measure one of pressure, air speed, and acceleration and/or detect distortion, fan stall, and/or other aeromechanical issues.

The sensor 66 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 66 may be a dynamic pressure transducer. The sensor 66 may also be a sensor configured to measure a rotational speed of the fan blades 14, which could be used along with an additional sensor that is a dynamic pressure transducer. In some embodiments, the sensor 66 may be a sensor configured to measure a rotation speed of another section of the engine 110.

The controller 62 of the control unit 30 is configured to receive a measurement from the sensor 66 or sensors 66 and direct the actuator 60 to pivot some or all of the vanes 26 to a corresponding position in response to the measurement of the at least one sensor 66. The controller 62 of the control unit 30 may be configured to direct actuator 60 to pivot some or all of the vanes 26 to the closed position when the measurements from the sensor 66 are within a predetermined threshold.

Then, when the measurement from the sensor 66 is outside of the predetermined threshold, the controller 62 directs the actuator 60 to pivot some or all of the vanes 26 to one of the intermediate open positions or the open position. Based on the difference of the measurement from the sensor 66 compared to the predetermined threshold, the controller 62 may vary the position of the vanes 26 to control the amount of fluid communication between the gas path 25 and the plenum 24 through the openings 27.

In some embodiments, the controller 62 of the control unit 30 may be configured to use a combination of the sensor measurements and the detected preprogrammed aircraft maneuver to control the position of the vanes 26. For example, when the controller 62 of the control unit 30 detects a preprogrammed aircraft maneuver and the measurement is outside of the predetermined threshold, the controller 62 directs the actuator 60 to pivot some or all of the vanes 26 to one of the intermediate open positions or the open position.

In some embodiments, the controller 62 of the control unit 30 is configured to use the measurements from the sensor 66 to anticipate the aircraft maneuver. The controller 62 of the control unit 30 is configured to direct the actuator 60 to pivot some or all of the vanes 26 to one of the intermediate open positions or the open position in response to the measurement from the sensor 66 even though no preprogrammed aircraft maneuver is detected.

Alternatively, there may be a delay in the measurements from the sensor 66. Therefore, the controller 62 of the control unit 30 is also configured to direct the actuator 60 to pivot some or all of the vanes 26 to one of the intermediate open positions or the open position when the one of the preprogrammed aircraft maneuvers is detected, even though the measurements from the sensor 66 are within the predetermined thresholds.

In some embodiments, the controller 62 of the control unit 30 may detect one of the preprogrammed aircraft maneuvers, but the measurements from the sensors 66 are within the predetermined threshold. If so, the controller 62 of the control unit 30 may direct some or all of the vanes 26 to remain in the current position.

A method of operating the inlet distortion mitigation system 22 may include several steps. During normal cruise conditions, the controller 62 directs the actuator 60 to locate the pivotable vanes 26 in the closed position. If the controller 62 detects one of a preselected operating condition other than the cruise condition, the controller 62 directs the actuator 60 to pivot the vanes 26 to one of the fully open position or one of the intermediate open positions depending on the operating condition detected to minimize the negative effects of pressure and swirl distortions to improve stall margin.

The method further includes continually adjusting the position of some or all of the vanes 26 based on the preselected operating condition of the engine 110. If the controller 62 detects the cruise condition, the controller 62 directs the actuator 60 to move the vanes 26 back to the closed position. In other instances, the controller 62 may direct the actuator 60 to control the position of the vanes 26 as discussed above based on the preprogrammed aircraft maneuvers and/or the measurements from the sensors.

Another embodiment of a fan case assembly 210 in accordance with the present disclosure is shown in FIGS. 8-11. The fan case assembly 210 is substantially similar to the fan case assembly 10 shown in FIGS. 1-7 and described herein. Accordingly, similar reference numbers in the 200 series indicate features that are common between the fan case assembly 10 and the fan case assembly 210. The description of the fan case assembly 10 is incorporated by reference to apply to the fan case assembly 210, except in instances when it conflicts with the specific description and the drawings of the fan case assembly 210.

Figure 8:
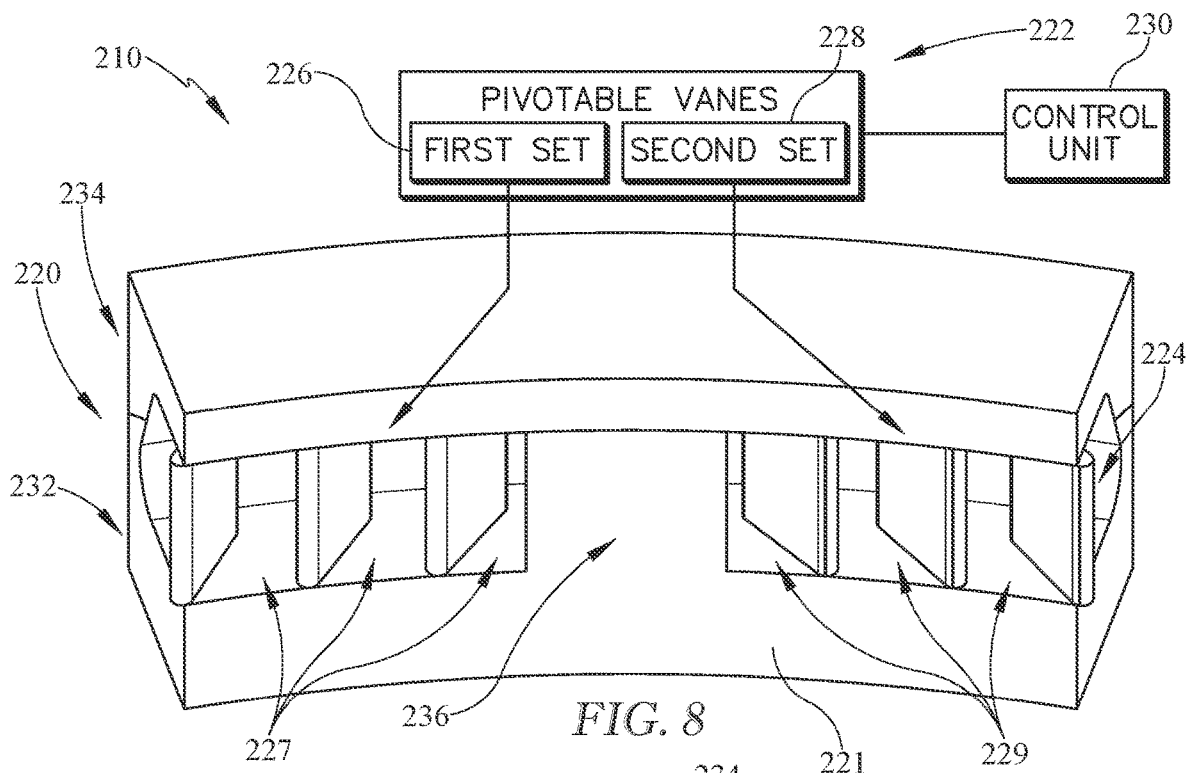
FIG. 8 is a perspective view of another embodiment of a fan case assembly included in the gas turbine engine of FIG. 1 showing the fan case assembly includes a case that defines a plenum and a plurality of vanes having a first set of vanes pivotably coupled to the case in the plenum to pivot in a first direction about the pivot axis from a closed position as shown in FIG. 10 to an open position as shown in FIG. 11 and a second set of vanes pivotably coupled to the case in the plenum to pivot in a second direction about the pivot axis opposite the first direction from the closed position to the open position.
Figure 9:
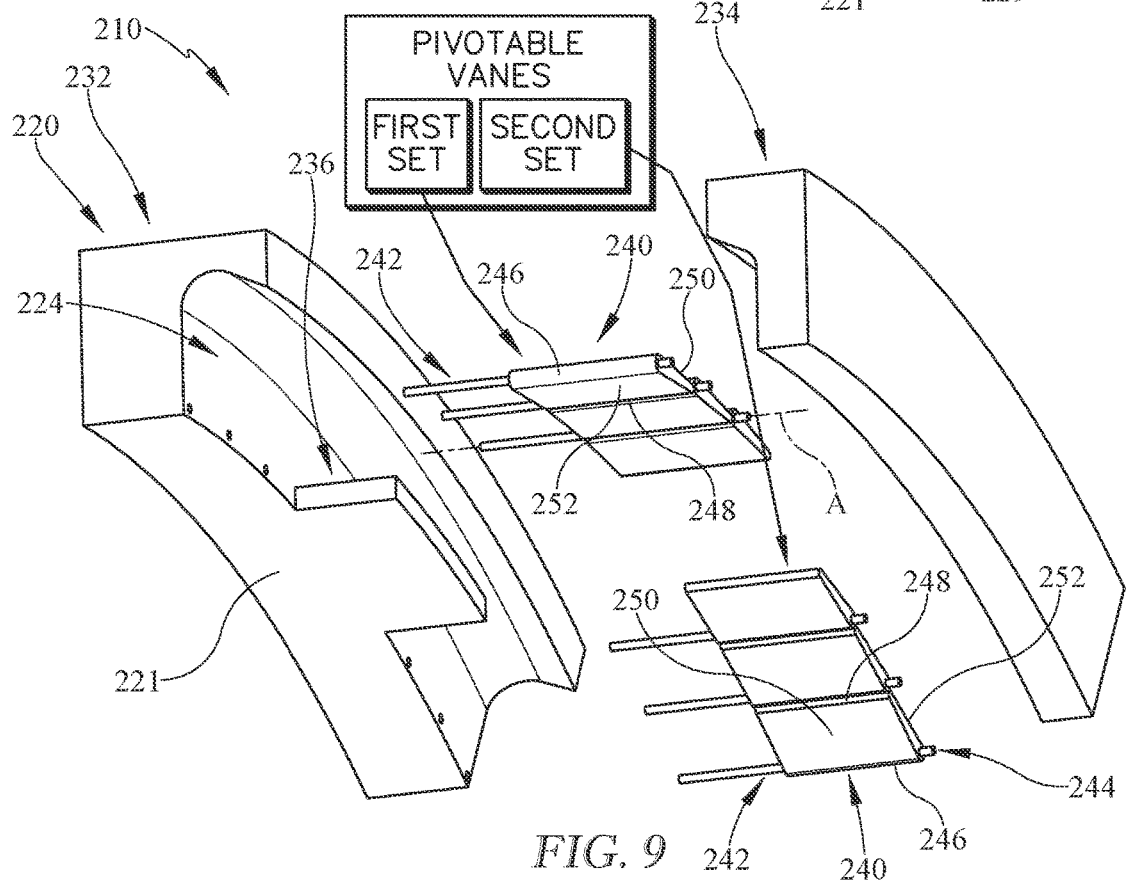
FIG. 9 is an exploded view of the fan case assembly of FIG. 8 showing the case includes a forward section, an aft section configured to be coupled to the forward section to trap the plurality of vanes axially therebetween in the plenum, and a partition that extends from the forward section to the aft section across the plenum, and further showing the first set of vanes are located on a first side of the partition and the second set of vanes are located on a second side of the partition so that the partition is circumferentially between the two sets of vanes.

The fan case assembly 210 includes, among other components, a case 220 and an inlet distortion mitigation system 222 as shown in FIGS. 8 and 9. The case 220 extends circumferentially at least partway about the axis 11 to define the outer boundary of the gas path 25 of the gas turbine engine 110. The case 220 is formed to define a plenum 224 that extends circumferentially at least partway about the axis 11 and is open to the gas path 25 of the gas turbine engine 110. The inlet distortion mitigation system 222 is configured to control fluid communication between the plenum 224 and the gas path 25 of the gas turbine engine 110.

The case 220 includes a forward section 232, an aft section 234, and a partition 236 as shown in FIG. 9. The aft section 234 is configured to be coupled to the forward section 232 to trap the plurality of vanes 226 axially therebetween in the plenum 224. The partition 236 extends from the forward section 232 to the aft section 234 across the plenum 224.

In the illustrative embodiment, the partition 236 is integrally formed with the forward section 232. In other embodiments, the partition 236 may be integrally formed with the aft section 234.

Figure 10:
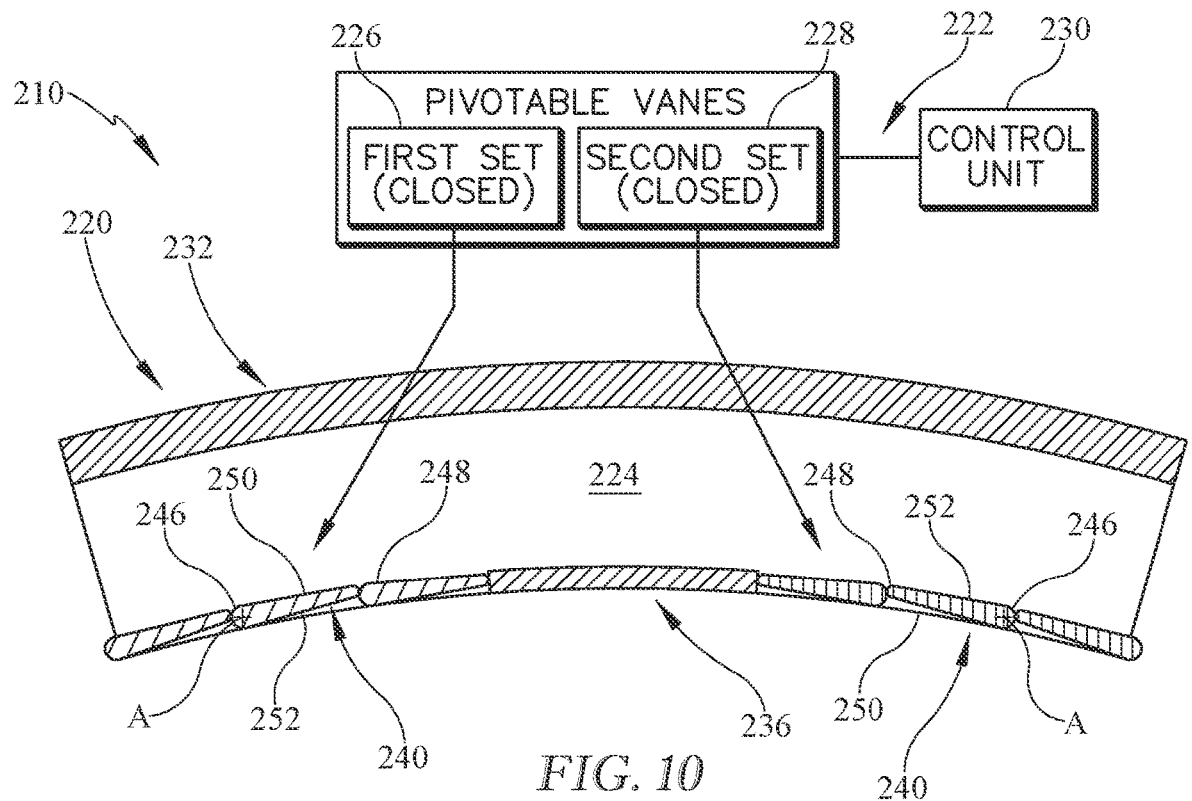
FIG. 10 is a cross-section view of the fan case assembly of FIG. 8 with the plurality of vanes in the closed position to block fluid communication between the gas path and the plenum.
Figure 11:
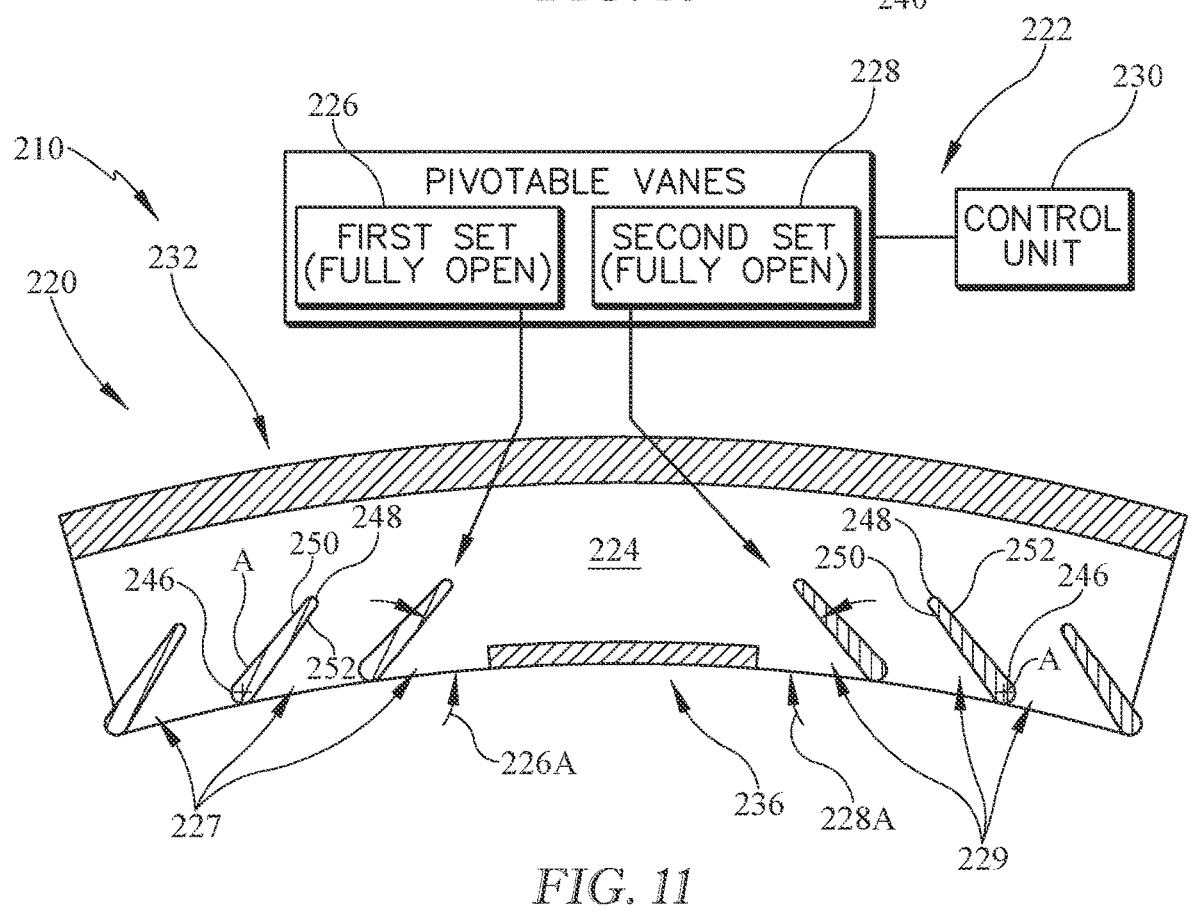
FIG. 11 is a cross-section view of the fan case assembly of FIG. 8 with the plurality of vanes in the fully open position in which each vane is at a maximum angle relative to the gas path to provide the maximum fluid communication between the gas path of the gas turbine engine and the plenum.

The inlet distortion mitigation system 222 includes a plurality of pivotable vanes 226, 228 and a control unit 230 as shown in FIGS. 9-11. The plurality of vanes 226 are pivotably coupled to the case 220 in the plenum 224 to pivot about a pivot axis A. The plurality of vanes 226, 228 are configured to pivot between a closed position as shown in FIG. 10, a plurality of intermediate open positions (not shown), and a fully open position as shown in FIG. 11. The control unit 230 is configured to move the plurality of vanes 226, 228 between the different positions in response to preselected operating conditions to control fluid communication between the plenum 224 and the gas path 25.

The plurality of vanes 226, 228 includes a first set of vanes 226 and a second set of vanes 228 as shown in FIGS. 8-11. The first set of vanes 226 are located on a first side of the partition 236, while the second set of vanes 228 are located on a second side of the partition 236 so that the partition 236 is circumferentially between the two sets of vanes 226, 228 as shown in FIGS. 8-11.

The first set of vanes 226 are arranged in series on one side of the partition 236, while the second set of vanes 228 are arranged in series on the other side of the partition 236 so that the second set of vanes 228 is spaced apart circumferentially from the first set of vanes 226 as shown in FIGS. 8-11.

In some embodiments, the partition 236 is omitted and one vane 226 from the first set and one vane 228 from the second set adjacent to the one vane 226 are kept in the closed position to form the partition 236. The two vanes 226, 228 block flow into the plenum 226, while other vanes 226, 228 in each set may be pivoted to open the openings 227, 229.

In the illustrative embodiment, three vanes 226 in the first set of vanes 226 are arranged in series and three vanes 228 in the second set of vanes 228 are arranged in series. In some embodiments, only two vanes 226 in the first set of vanes 226 are arranged in series and two vanes 228 in the second set of vanes 228 are arranged in series. In some embodiments, more than three vanes 226 in the first set of vanes 226 are arranged in series and more three vanes 228 in the second set of vanes 228 are arranged in series.

In some embodiments, the number of vanes 226 in the first set of vanes 226 is greater than the number of vanes 228 in the second set of vanes 228. In other embodiments, the number of vanes 226 in the first set of vanes 226 is less than the number of vanes 228 in the second set of vanes 228.

The first set of vanes 226 are configured to pivot in a first direction about the pivot axis A from the closed position to the open position and the second set of vanes 228 are configured to pivot in a second direction about the pivot axis A from the closed position to the open position as shown in FIGS. 10 and 11. The second direction is opposite the first direction in the illustrative embodiment.

The first set of vanes 226 pivot in the first direction to open the openings 227 to allow flow into the plenum 224. The second set of vanes 228 pivot in the second direction to open the openings 229 to allow flow out of the plenum 224.

Each of the vanes 226, 228 includes an airfoil 240 and a pair of pegs 242, 244 as shown in FIG. 9. The pair of pegs 242, 244 are coupled to the airfoil 240 and extend axially from the airfoil 240 to fit into peg holes formed in the forward and aft sections 232, 234 of the case 220.

The airfoil 240 of each vane 226 has a pivot end 246, a trailing end 248, a first side surface 250, and a second side surface 252 as shown in FIGS. 9-11. The pivot end 246 is coupled to the case 220 to be the pivot point of the vane respective vane 226, 228. The trailing end 248 is spaced apart circumferentially from the pivot end 246. The first and second side surfaces 250, 252 each extend between and interconnect the pivot end 246 and the trailing end 248.

In the illustrative embodiment, the first side surface 250 of the each vane 228 faces the gas path 25 and the second side surface 252 of the each vane 228 that faces the plenum 224 when each vane 226 is in the closed position. The first set of vanes 226 are flipped compared to the second set of vanes 228 so that the pivot end 246 of each vane 226 faces towards the pivot end 246 of the second set of vanes 228. In this way, the second side surface 252 of the each vane 226 faces the gas path 25 and the first side surface 250 of the each vane 226 that faces the plenum 224 when each vane 226 is in the closed position.

In the illustrative embodiment, the vanes 226 are coupled to the case 220 so that the trailing end 248 of one vane 226 is adjacent to the pivot end 246 of the adjacent vane 226 as shown in FIG. 9. The vanes 226 are spaced apart circumferentially so that the pivot end 246 of one vane 226 is adjacent to the trailing end 248 of the adjacent vane 226. The trailing end 248 is pivoted away from the pivot end 246 of the adjacent vane 226 to provide the opening 227 as shown in FIGS. 10 and 11.

Similarly, the vanes 228 are coupled to the case 220 so that the trailing end 248 of one vane 228 is adjacent to the pivot end 246 of the adjacent vane 228 as shown in FIG. 9. The vanes 228 are spaced apart circumferentially so that the pivot end 246 of one vane 228 is adjacent to the trailing end 248 of the adjacent vane 228. The trailing end 248 is pivoted away from the pivot end 246 of the adjacent vane 228 to provide the opening 229 as shown in FIGS. 10 and 11.

Both sets of vanes 226, 228 are pivotable between the closed position and the fully open position to change the angle of the vanes 226, 228 relative to the gas path 25. In the closed position, each vane 226, 228 cooperates with an inner surface of the case 220 to define the outer boundary of the gas path 25 to block fluid communication between the gas path 25 and the plenum 224 as shown in FIG. 10. Each of the vanes 226, 228 forms a part of the outer boundary of the gas path 25 thereby covering any opening of the plenum 224 to block fluid communication between the gas path 25 and the plenum 224 when each of the vanes 226, 228 are in the closed position.

In the fully open position, each vane 226, 228 is at a maximum angle 226A, 228A relative to the gas path 25 to provide the openings 227 to allow fluid communication between the gas path 25 of the gas turbine engine 110 and the plenum 224. This permits air pressure and flows to better equalize circumferentially to improve stall margin.

The plurality of intermediate open positions are between the closed position and the fully open position. In any one of the intermediate open positions, each vane 226, 228 is at an intermediate angle (not shown) relative to the gas path 25. The intermediate angle is less than the maximum angle 226A, 228A so as to modulate the size of the openings 227.

The control unit 230 is configured to pivot the vanes 226, 228 between the different positions in response to preselected operating conditions. The control unit 230 is configured to control movement of the first set of vanes 226 independent from the second set of vanes 228 in the illustrative embodiment. In other embodiments, the control unit 230 includes a separate actuator for each vane 226, 228 so that the position of each vane 226, 228 are independently controlled.

The preselected operating conditions include a plurality of preprogrammed aircraft maneuvers stored on a memory included in the control unit 230. The plurality of preprogrammed aircraft maneuvers include banks, turns, rolls, etc.

The control unit 230 is configured to detect a preprogrammed aircraft maneuver included in the plurality of preprogrammed aircraft maneuvers. Once the preprogrammed aircraft maneuver is detected, the control unit 230 directs each of the vanes 226, 228 to pivot to a corresponding position in response to detecting the preprogrammed aircraft maneuver.

For example, both the first and second set of vanes 226, 228 may normally be in the closed position during a cruise condition so that no additional stall margin is created, but performance is not compromised. Then, when the control unit 230 detects a preprogrammed aircraft maneuver, i.e. banks, turns, rolls, the control unit 230 directs the sets of vanes 226, 228 to pivot to one of the intermediate open positions or the fully open position so that flow is permitted into the plenum 224. This permits air pressure and flows to better equalize circumferentially around the fan 112 to improve stall margin of the gas turbine engine 110.

Conversely, when the control unit 230 detects the cruise condition after a preprogrammed aircraft maneuver, the control unit 230 directs the vanes 226, 228 to pivot to the closed position. Therefore, once the aircraft maneuver is completed, the vanes 226, 228 move to the closed position to performance is not compromised and the additional stall margin is removed during the cruise condition.

The control unit 230 is configured to direct some or all of the vanes 226, 228 of the different sets to pivot from the closed position to one of the intermediate open positions or the fully open position based on the detected preprogrammed aircraft maneuver. Depending on the preprogrammed aircraft maneuver, the control unit 230 may directly only certain vanes 226, 228 of each set to move to one of the intermediate open positions or the fully open position, while keeping others in the closed position.

Additionally, the control unit 230 may direct some of the vanes 226, 228 of reach set to remain in the closed position, while directing some of the vanes 226, 228 to pivot to the fully opened position and others to an intermediate open position. The control unit 230 is configured to direct some of the vanes 226, 228 to pivot to one intermediate open position while others are pivoted to another intermediate open position. In other words, the control unit 230 is configured to individual vary the angle of each of the vanes 226, 228.

Additionally, the control unit 230 may direct some or all of the vanes 226 to remain in the closed position, while directing some or all of the vanes 228 to pivot to the fully opened position and/or one of intermediate open positions. The control unit 230 may direct some or all of the vanes 228 to remain in the closed position, while directing some or all of the vanes 226 to pivot to the fully opened position and/or one of intermediate open positions.

If the fan 112 includes a plurality of fan case assemblies 210, the control unit 230 may direct some or all of the first set of vanes 226 of a first fan case assembly to remain in the closed position, while directing some or all of the first set of vanes 226 of an adjacent fan case assembly 210 to pivot to the fully opened position and/or one of intermediate open positions. The control unit 230 may independently control the second set of vanes 228 of adjacent fan case assemblies 210 to open to allow flow out of the plenum 224.

Similarly, the control unit 230 is configured to receive a measurement from the at least one sensor or sensors and direct the vanes 226, 228 to pivot to a corresponding position in response to the measurement like as discussed above with respect to the embodiment of FIGS. 1-7. In some embodiments, the control unit 230 may be configured to use a combination of the sensor measurements and the detected preprogrammed aircraft maneuver to control the position of the plurality of vanes 226, 228.

Another embodiment of a fan case assembly 310 in accordance with the present disclosure is shown in FIGS. 12-17. The fan case assembly 310 is substantially similar to the fan case assembly 10 shown in FIGS. 1-7 and described herein. Accordingly, similar reference numbers in the 300 series indicate features that are common between the fan case assembly 10 and the fan case assembly 310. The description of the fan case assembly 10 is incorporated by reference to apply to the fan case assembly 310, except in instances when it conflicts with the specific description and the drawings of the fan case assembly 310.

Figure 12:
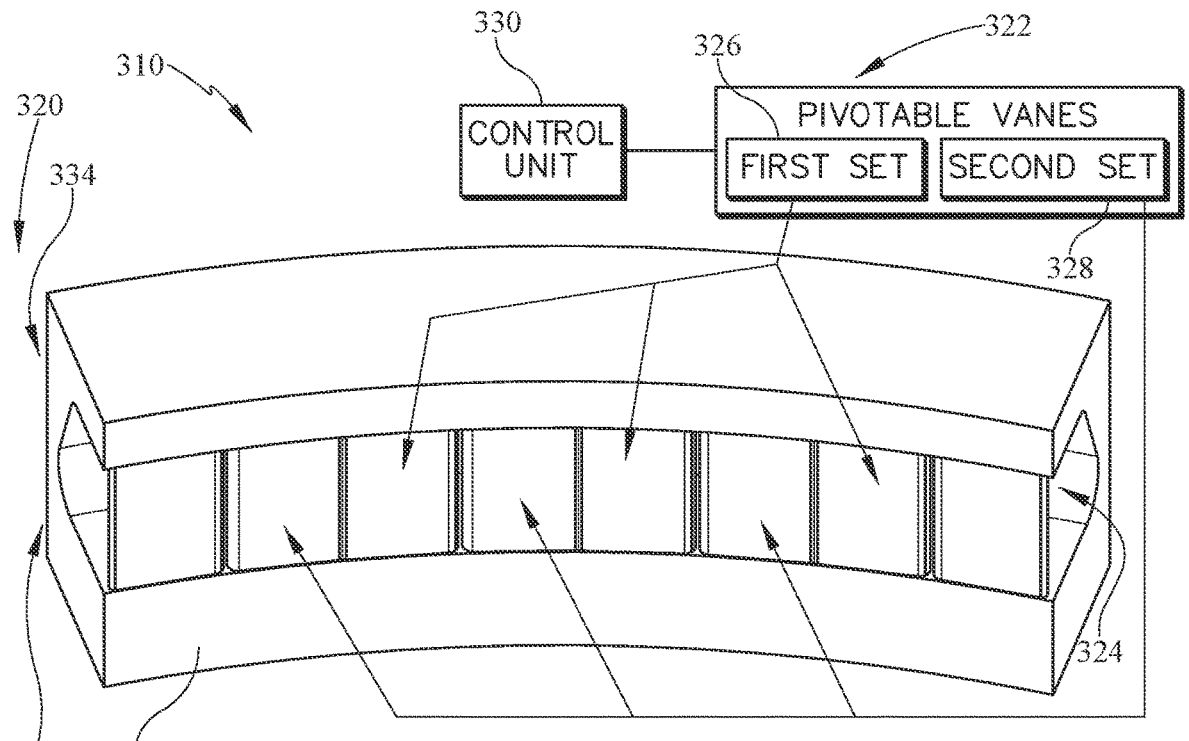
FIG. 12 is a perspective view of another embodiment of a fan case assembly included in the gas turbine engine of FIG. 1 showing the fan case assembly includes a case that defines a plenum and a plurality of vanes having a first set of vanes pivotably coupled to the case in the plenum to pivot in a first direction about the pivot axis from a closed position as shown in FIG. 14 to an open position as shown in FIG. 15 and a second set of vanes pivotably coupled to the case in the plenum to pivot in a second direction about the pivot axis opposite the first direction from the closed position as shown in FIG. 14 to an open position as shown in FIG. 16.
Figure 13:
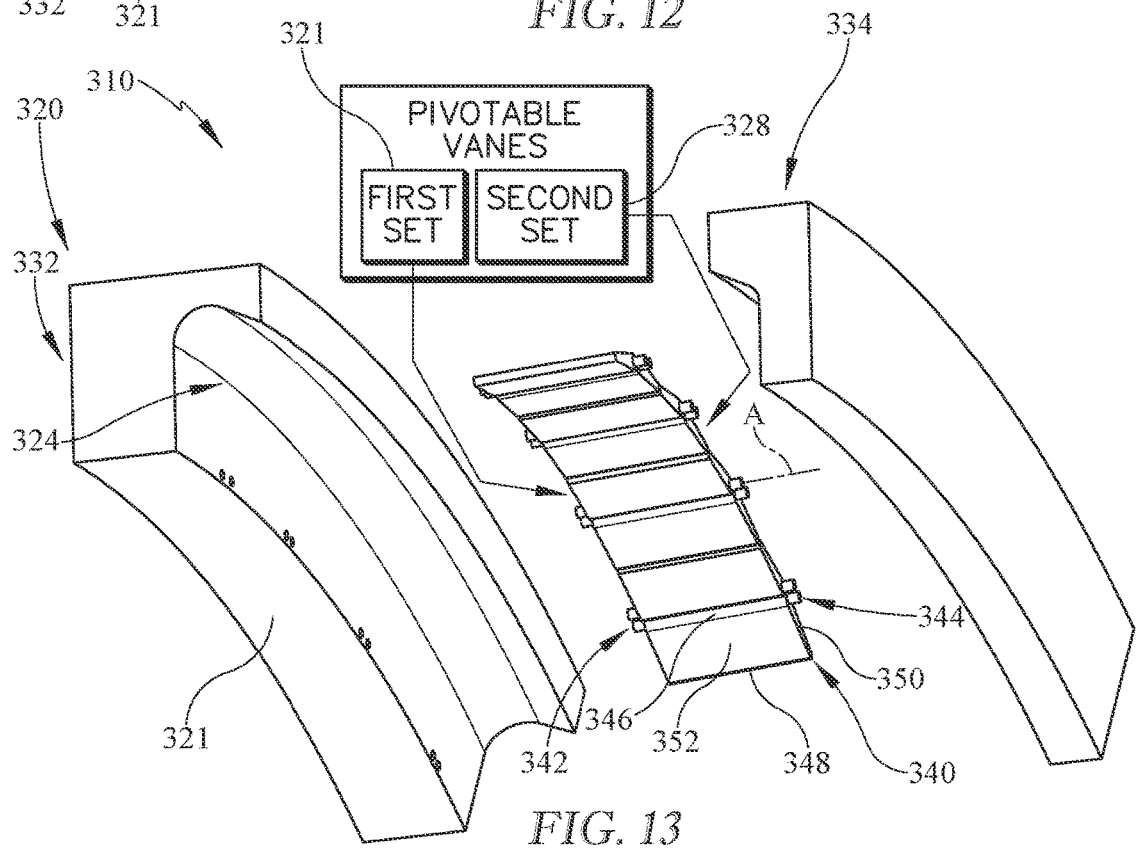
FIG. 13 is an exploded view of the fan case assembly of FIG. 12 showing the case includes a forward section and an aft section configured to be coupled to the forward section to trap the plurality of vanes axially therebetween in the plenum, and further showing the first set of vanes are alternated circumferentially between the second set of vanes.

The fan case assembly 310 includes, among other components, a case 320 and an inlet distortion mitigation system 322 as shown in FIGS. 12 and 13. The case 320 extends circumferentially at least partway about the axis 11 to define the outer boundary of the gas path 25 of the gas turbine engine 110. The case 320 is formed to define a plenum 324 that extends circumferentially at least partway about the axis 11 and is open to the gas path 25 of the gas turbine engine 110. The inlet distortion mitigation system 322 is configured to control fluid communication between the plenum 324 and the gas path 25 of the gas turbine engine 110.

The case 320 includes a forward section 332 and an aft section 334 as shown in FIG. 13. The aft section 334 is configured to be coupled to the forward section 332 to trap the plurality of vanes 326 axially therebetween in the plenum 324.

Figure 14:
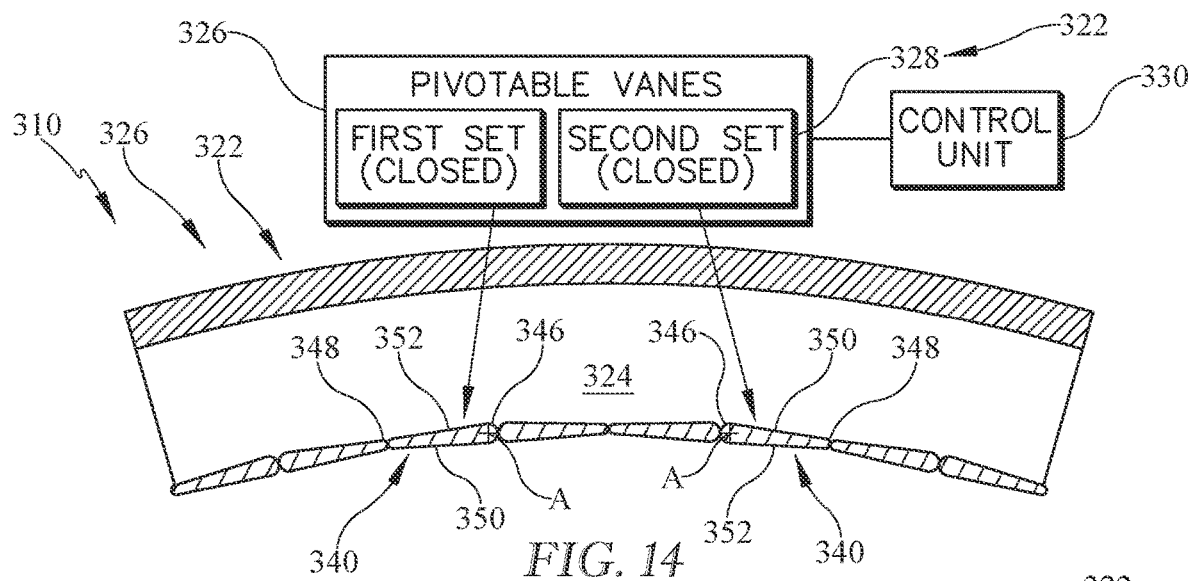
FIG. 14 is a cross-section view of the fan case assembly of FIG. 12 with the both the first set of vanes and the second set of vanes are in the closed position to block fluid communication between the gas path and the plenum.
Figure 15:
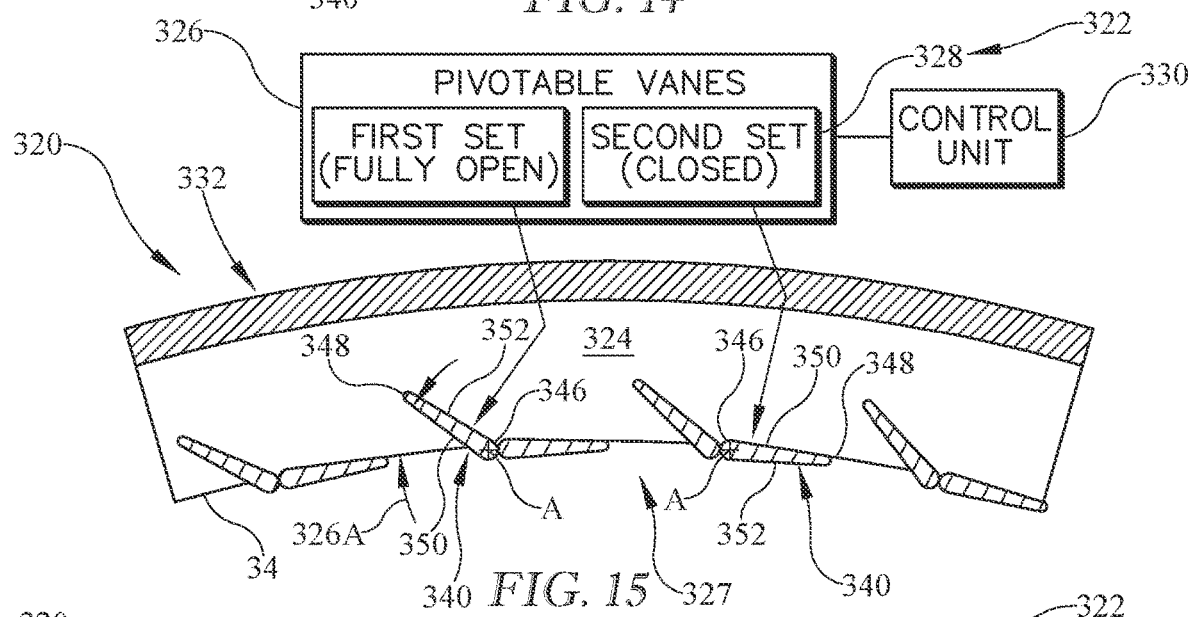
FIG. 15 is a cross-section view of the fan case assembly of FIG. 12 with the second set of vanes still in the closed position and the first set of vanes in the fully open position.
Figure 16:
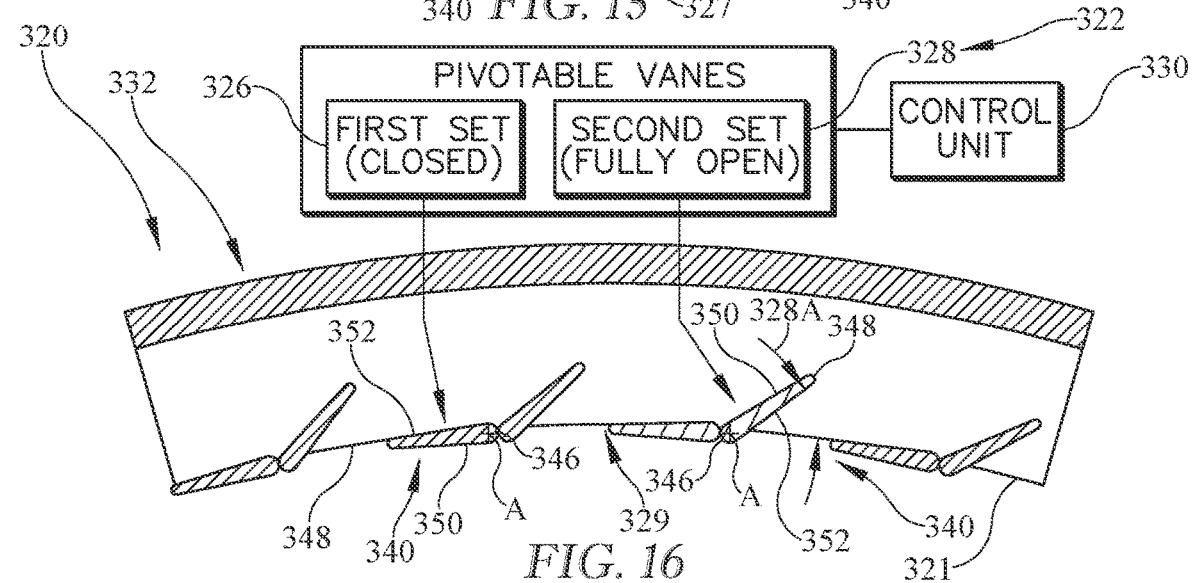
FIG. 16 is a cross-section view of the fan case assembly of FIG. 12 with the first set of vanes still in the closed position and the second set of vanes in the fully open position.

The inlet distortion mitigation system 322 includes a plurality of pivotable vanes 326, 328 and a control unit 330 as shown in FIGS. 13-16. The plurality of vanes 326 are pivotably coupled to the case 320 in the plenum 324 to pivot about a pivot axis A. The plurality of vanes 326, 328 are configured to pivot between a closed position as shown in FIG. 14, a plurality of intermediate open positions (not shown), and a fully open position as shown in FIGS. 15 and 16. The control unit 330 is configured to move the plurality of vanes 326, 328 between the different positions in response to preselected operating conditions to control fluid communication between the plenum 324 and the gas path 25.

The plurality of vanes 326, 328 includes a first set of vanes 326 and a second set of vanes 328 as shown in FIGS. 12-16. The first set of vanes 326 are alternated circumferentially between the second set of vanes 328.

The first set of vanes 326 are configured to pivot in a first direction about the pivot axis A from the closed position to the open position as shown in FIG. 15 and the second set of vanes 328 are configured to pivot in a second direction about the pivot axis A from the closed position to the open position as shown in FIG. 16. The second direction is opposite the first direction in the illustrative embodiment.

The first set of vanes 326 pivot in the first direction to open the openings 327 as shown in FIG. 15, while the second set of vanes 328 pivot in the second direction as shown in FIG. 16. Similar to the embodiment of FIGS. 8-11, the first set of vanes 326 may pivot to the one of the open positions to allow flow into the plenum 224. The second set of vanes 228 may pivot to the one of the open positions to allow flow out of the plenum 224. The control unit 330 can individually control the position of the vanes 326, 328 to control where the openings 327, 329 are formed around the axis 11 of the gas turbine engine 110.

Each of the vanes 326, 328 includes an airfoil 340 and a pair of pegs 342, 344 as shown in FIG. 13. The pair of pegs 342, 344 are coupled to the airfoil 340 and extend axially from the airfoil 340 to fit into peg holes formed in the forward and aft sections 332, 334 of the case 320.

The airfoil 340 of each vane 326 has a pivot end 346, a trailing end 348, a first side surface 350, and a second side surface 352 as shown in FIGS. 13-16. The pivot end 346 is coupled to the case 320 to be the pivot point of the respective vane 326, 328. The trailing end 348 is spaced apart circumferentially from the pivot end 346. The first and second side surfaces 350, 352 each extend between and interconnect the pivot end 346 and the trailing end 348.

In the illustrative embodiment, the first side surface 350 of the each vane 326 faces the gas path 25 and the second side surface 352 of the each vane 326 that faces the plenum 324 when each vane 326 is in the closed position. Each vane 328 second set of vanes 328 are flipped so that the pivot end 346 of each vane 328 is located next to the pivot end 346 of each vane 326 of the first set of vanes 326. In this way, the second side surface 352 of the each vane 328 faces the gas path 25 and the first side surface 350 of the each vane 328 that faces the plenum 324 when each vane 326 is in the closed position.

In the illustrative embodiment, the vanes 326 are coupled to the case 320 so that the trailing end 348 of one vane 326 is adjacent to the pivot end 346 of the adjacent vane 326 as shown in FIG. 14-16. The vanes 326 are spaced apart circumferentially so that the pivot end 346 of one vane 326 is adjacent to the trailing end 348 of the adjacent vane 326. The trailing end 348 is pivoted away from the pivot end 346 of the adjacent vane 326 to provide the opening 327 as shown in FIG. 15.

Similarly, the vanes 328 are coupled to the case 320 so that the trailing end 348 of one vane 328 is adjacent to the pivot end 346 of the adjacent vane 328 as shown in FIG. 14-16. The vanes 328 are spaced apart circumferentially so that the pivot end 346 of one vane 328 is adjacent to the trailing end 348 of the adjacent vane 328. The trailing end 348 is pivoted away from the pivot end 346 of the adjacent vane 328 to provide the opening 329 as shown in FIG. 16.

Both sets of vanes 326, 328 are pivotable between the closed position and the fully open position to change the angle of the vanes 326, 328 relative to the gas path 25. In the closed position, each vane 326, 328 cooperates with an inner surface of the case 320 to define the outer boundary of the gas path 25 to block fluid communication between the gas path 25 and the plenum 324 as shown in FIG. 14. In the fully open position, each vane 326, 328 is at a maximum angle 326A, 328A relative to the gas path 25 to provide the openings 327 to allow fluid communication between the gas path 25 of the gas turbine engine 110 and the plenum 324.

The control unit 330 is configured to pivot the vanes 326, 328 between the different positions in response to preselected operating conditions. The control unit 330 is configured to control movement of the first set of vanes 326 independent from the second set of vanes 328 in the illustrative embodiment. In other embodiments, the control unit 330 includes a separate actuator for each vane 326, 328 so that the position of each vane 326, 328 are independently controlled.

The preselected operating conditions include a plurality of preprogrammed aircraft maneuvers stored on a memory included in the control unit 330. The plurality of preprogrammed aircraft maneuvers include banks, turns, rolls, etc.

The control unit 330 is configured to detect a preprogrammed aircraft maneuver included in the plurality of preprogrammed aircraft maneuvers. Once the preprogrammed aircraft maneuver is detected, the control unit 330 directs each of the vanes 326, 328 to pivot to a corresponding position in response to detecting the preprogrammed aircraft maneuver.

For example, both the first and second set of vanes 326, 328 may normally be in the closed position during a cruise condition so that no additional stall margin is created, but performance is not compromised. Then, when the control unit 330 detects a preprogrammed aircraft maneuver, i.e. banks, turns, rolls, the control unit 330 directs the sets of vanes 326, 328 to pivot to one of the intermediate open positions or the fully open position so that flow is permitted into the plenum 324. This permits air pressure and flows to better equalize circumferentially around the fan 112 and provides additional stall margin benefit.

Conversely, when the control unit 330 detects the cruise condition after a preprogrammed aircraft maneuver, the control unit 330 directs the vanes 326, 328 to pivot to the closed position. Therefore, once the aircraft maneuver is completed, the vanes 326, 328 move to the closed position to performance is not compromised and the additional stall margin is removed during the cruise condition.

The control unit 330 is configured to direct some or all of the vanes 326, 328 of the different sets to pivot from the closed position to one of the intermediate open positions or the fully open position based on the detected preprogrammed aircraft maneuver. Depending on the preprogrammed aircraft maneuver, the control unit 330 may directly only certain vanes 326, 328 of each set to move to one of the intermediate open positions or the fully open position, while keeping others in the closed position in an effort to mitigate pressure distortions around the fan 112.

Additionally, the control unit 330 may direct some of the vanes 326, 328 of reach set to remain in the closed position, while directing some of the vanes 326, 328 to pivot to the fully opened position and others to an intermediate open position. The control unit 330 is configured to direct some of the vanes 326, 328 to pivot to one intermediate open position while others are pivoted to another intermediate open position. In other words, the control unit 330 is configured to individual vary the angle of each of the vanes 326, 328.

Additionally, the control unit 330 may direct some or all of the vanes 326 to remain in the closed position, while directing some or all of the vanes 328 to pivot to the fully opened position and/or one of intermediate open positions. The control unit 330 may direct some or all of the vanes 328 to remain in the closed position, while directing some or all of the vanes 326 to pivot to the fully opened position and/or one of intermediate open positions.

Similarly, the control unit 330 is configured to receive a measurement from the at least one sensor or sensors and direct the vanes 326, 328 to pivot to a corresponding position in response to the measurement like as discussed above with respect to the embodiment of FIGS. 1-7. In some embodiments, the control unit 330 may be configured to use a combination of the sensor measurements and the detected preprogrammed aircraft maneuver to control the position of the plurality of vanes 326, 328.

When dealing with embedded inlet distortion, there may be a steep trade between stall margin and performance of the engine. There may be points during a mission or moments with maneuvers where it may be desirable to incorporate a different available stall margin or to be able to more evenly distribute flows. Attempting to solve the worst stall condition, while maintaining performance over all of the cycle or flight conditions may be difficult and result in compromised efficiency or a limited flight envelope.

Therefore, the fan 112 includes an inlet distortion mitigation system 22, 222, 322 which includes a plurality of pivotable vanes 26, 226, 228, 326, 328 configured to control fluid communication between the plenum 24, 224, 324 and the gas path 25. The plenum 24, 224, 324 is formed in the case 20, 220, 320 at a leading edge 16 of the fan blades 14.

In the first condition, or the closed position, any opening to the plenum 24, 224, 324 would be closed so no additional stall margin is created, but performance is not compromised. In a second condition, or the fully open position, the plurality of vanes 26, 226, 228, 326, 328 rotates or pivots to permit flows into the plenum 24, 224, 324. This permits air pressure and flows to better equalize circumferentially and provides additional stall margin benefit. The angle of the vanes 26, 226, 228, 326, 328 may be adjusted to tune the arrangement to particular needs or conditions.

The plurality of vanes 26, 226, 228, 326, 328 permit the fan 112 to optimize efficiency at a cruise point with limited distortion, while being able to maintain adequate stall margin at another condition. By activating the pivotable vanes 26, 226, 228, 326, 328 to trade efficiency for stall margin improvement, but not have to live with that trade at all times, the inlet distortion mitigation system 22, 222, 322 allows optimization of the fan 112.

The vanes 26, 226, 228, 326, 328 may open a little bit at some conditions and then a greater amount at others to modulate openness to the plenum 24, 224, 324 as suggested in FIGS. 5-7. It permits the turbofan engine to be designed with multiple potential configurations, which allow it to be optimized to different conditions with one assembly. This may eliminate a troublesome trade between stall margin and performance potentially, or may allow the engine 110 to able to handle more extreme inlet distortion during maneuvering.

The vanes 26 may also be turned beyond 90 degrees and increase flows into a low pressure area or sector that has stall developing. This may mean that some of the vanes 26 may have shallow angles to allow flow into the plenum 24 and other vanes 26 may have obtuse angles to have flow out of plenum 24. In such instances, the obtuse angled vanes 26 are spaced apart circumferentially from the acute angled vanes 26 and not directly next to each other to avoid a clash. Or vanes 26 may be closed between the vanes 26 which open in opposite directions to avoid large angles.

The vaned plenum 24, 224, 324 uses pivoting of the vanes 26, 226, 28, 326, 328 to open or close the passage of air to the plenum 24, 224, 324. The vanes 26, 226, 228, 326, 328 may be opened to a range of angles between 0 to about 45 degrees.

This may be done with all vanes 26 controlled the same, or with different angles for different sectors via ganging. The channel or plenum 24 itself may have different cross-sections when viewed in the circumferential direction. In the illustrative embodiment, the cross-section of the plenum 24 is a forward-leaning cross-sectional shape outboard of the space for the vane 26. In some embodiments, the cross-section of the plenum 24 may have different shape. In some embodiments, the plenum 24 may have a deeper axial offset and extend axially forward further into the case 20, while the opening 27 stays the same. In any case, the plenum 24 has enough radial space for clearance of the vane 26 to the desired angle of rotation.

In FIG. 5, the vanes 26 are closed, such that there is a barrier in place to limit flows into the plenum 24. In the illustrative embodiment, the vanes 26 are at the flow path 25. The plenum 24 has a forward lean to resemble a forward-leaning cross-sectional shape instead of purely a rectilinear cross-section.

When the vanes are rotated, the air flows into the plenum 24, which then produce a tilt circumferentially. The air may flow tangentially in the plenum 24 to other portions of the fan leading edge, which helps to mitigate stall. Stall may develop locally at one circumferential location, but then flows from other portions leak into this sector, helping to overcome stall development. This is particularly helpful with distortion where greater pockets of pressure relative to the average pressure may exist.

The vanes 26 are not likely to form a perfect seal without a seal flap between. However, any leaking may be acceptable by mitigating most of the flow into the plenum 24 at cruise conditions (when vanes are in the closed position). The vanes 26, 226, 228, 326, 328 may be curved to match the inner diameter of the case 20, 220, 320.

The inlet distortion mitigation system 22, 222, 322 includes the ability to have a variable openness, not just binary open or closed. The flows entering the vaned plenum 24, 224, 324 are thus modulated potentially to different conditions (mission, maneuvers, etc.). In FIG. 6, the vanes 26 are at an intermediate open position. In the illustrative embodiment, the intermediate angle 26B is about 22.5 degrees. In some embodiments, the intermediate angle 26B may be between 0 degrees and 45 degrees.

The case 20 and the plenum 24 were generally modeled to allow for 45 degrees of vane rotation, as shown in FIG. 6. This concept may be a potential way to utilize the vanes 26 for the purposes of turning the vaned plenum 24 on or off (open or closed).

In some embodiments, the vanes 26, 226, 228, 326, 328 may be ganged by sectors and have some vanes 26, 226, 228, 326, 328 at different circumferential locations be open to flow into the plenum 24 and other vanes 26, 226, 228, 326, 328 to help flow out of the plenum. Other vanes 26, 226, 228, 326, 328 in the middle may be closed. While all vanes 26 may be in one direction as in FIGS. 4-5, the air would have to flow past the vane 26 and then between it and a neighboring to flow out. In FIGS. 8-16, the vanes 226, 228, 326, 328 make it easier for air to exit the plenum 224, 324.

The control unit 30, 230, 330 is configured to pivot the vanes 26, 226, 228, 326, 328 to avoid conflicts between vanes 26, 226, 228, 326, 328 going opposing directions. The system may include a static (closed) vane or the partition 236 at the border between two sectors to avoid this.

In order to allow the rotation to 90 degrees and past it, the radial space may be larger than just the space for a 45 degree maximum vane angle. The size of the plenum 24, 224, 324 may be adjusted to allow the vanes 26, 226, 228, 326, 328 to pivot past 90 degrees.

Another approach would be to have the partition 236 between sectors closed. Then the vanes 226, 228 on to each side of the partition 236 may open in opposite directions (one flow "in" and one flow "out"). This would enable smaller packaging due to less radial space required for vanes that only open 45 degrees compared to needing a full 180 degrees potentially.

If this is carried around the circumference of the fan 112, then sectors with high pressure may open to have flow enter the plenum 224 and then areas with low pressure may have vanes open to allow flow to exit. The system may allow flows and pressures to be piped around the fan 112 to alleviate issues without disrupting the majority of the circumference. If a fan application does not have portions that even need flow to enter or exit, then it may be closed off and mechanisms removed, so they are only in areas where this is needed to minimize system weight. The plenum 24, 224, 324 may still exist in this area however.

The control unit 30 is configured to use sensor inputs from a sensor 66 to control operation of the vanes 26. The sensor 66 may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

For example, altitude and fan speed may provide data to engage mitigation, while also providing maneuver detection or regime/mission phase framing of control logic. Additionally, static wall pressure, dynamic pressure transducers, blade tip timing, blade untwist as well as fan speed and altitude may be used in distortion/effect detection for the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising:
   a case that extends circumferentially at least partway about an axis to define an outer boundary of a gas path of the gas turbine engine, the case formed to define a plenum that extends circumferentially at least partway about the axis and is open to the gas path of the gas turbine engine,
   a plurality of vanes pivotably coupled to the case in the plenum to pivot about a pivot axis between a closed position in which each vane cooperates with an inner surface of the case to define the outer boundary of the gas path to block fluid communication between the gas path and the plenum and a fully open position in which each vane is at a maximum angle relative to the gas path to provide an opening to allow fluid communication between the gas path of the gas turbine engine and the plenum, and a control unit coupled to the plurality of vanes and configured to move each vane of the plurality of vanes between the closed position and the fully open position in response to preselected operating conditions to minimize pressure and swirl distortions in the gas turbine engine to improve stall margin for the gas turbine engine.

2. The fan case assembly of claim 1, wherein the plurality of vanes are each configured to pivot relative to the case to a plurality of intermediate open positions between the closed position and the fully open position in which the each vane is at an intermediate angle relative to the gas path that is less than the maximum angle so as to vary the fluid communication between the gas path of the gas turbine engine and the plenum.

3. The fan case assembly of claim 1, wherein each vane of the plurality of vanes includes an airfoil and a pair of pegs coupled to the airfoil, the airfoil having a pivot end, a trailing end spaced apart circumferentially from the pivot end, a first side surface that extends between and interconnects the pivot end and the trailing end and faces the gas path of the gas turbine engine, and a second side surface opposite the first side surface that extends between and interconnects the pivot end and the trailing end and faces the plenum, and the pair of pegs extend from the airfoil near the pivot end to the case to couple the respective vane to the case.

4. The fan case assembly of claim 3, wherein the plurality of vanes includes a first set of vanes configured to pivot in a first direction about the pivot axis from the closed position to the open position and a second set of vanes configured to pivot in a second direction about the pivot axis opposite the first direction from the closed position to the open position.

5. The fan case assembly of claim 4, wherein the first set of vanes are arranged in series and the second set of vanes are arranged in series spaced apart circumferentially from the first set of vanes.

6. The fan case assembly of claim 4, wherein the first set of vanes are alternated circumferentially between the second set of vanes.

7. The fan case assembly of claim 1, wherein the control unit includes at least one actuator coupled to the plurality of vanes and configured to drive movement of the plurality of vanes between the closed position and the fully open position and a controller coupled to the at least one actuator and configured to direct the at least one actuator to move the plurality of vanes to the closed position when the gas turbine engine is in a cruise condition included in the preselected operating conditions.

8. The fan case assembly of claim 7, wherein the control unit further includes a memory coupled to the controller, the memory including a plurality of preprogrammed aircraft maneuvers that each correspond to one of the closed position and the fully open position, and wherein the controller is configured to detect a preprogrammed aircraft maneuver included in the plurality of preprogrammed aircraft maneuvers on the memory and direct the at least one actuator to move the plurality of vanes to a corresponding position in response to detecting the preprogrammed aircraft maneuver.

9. The fan case assembly of claim 8, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the plurality of vanes to a corresponding position in response to the measurement of the at least one sensor.

10. The fan case assembly of claim 7, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the plurality of vanes to a corresponding position in response to the measurement of the at least one sensor.

11. A gas turbine engine comprising:
a fan including a fan rotor configured to rotate about an axis of the gas turbine engine and a plurality of fan blades coupled to the fan rotor for rotation therewith,
a fan case assembly that extends circumferentially around the plurality of fan blades radially outward of the plurality of fan blades, the fan case assembly comprising a case that extends circumferentially at least partway about the axis, the case formed to define a plenum that extends circumferentially at least partway about the axis and is open to a gas path of the gas turbine engine,
a plurality of vanes pivotably coupled to the case in the plenum to pivot about a pivot axis between a closed position in which each vane covers a portion of the plenum to block fluid communication between the gas path and the plenum and a fully open position in which each vane is at a maximum angle relative to the gas path to provide an opening to allow fluid communication between the gas path of the gas turbine engine and the plenum, and
a control unit coupled to the plurality of vanes and configured to move each vane of the plurality of vanes between the closed position and the fully open position in response to preselected operating conditions.

12. The gas turbine engine of claim 11, wherein the plurality of vanes are each configured to pivot relative to the case to a plurality of intermediate open positions between the closed position and the fully open position in which each vane of the plurality of vanes is at an intermediate angle relative to the gas path that is less than the maximum angle so as to vary the fluid communication between the gas path of the gas turbine engine and the plenum.

13. The gas turbine engine of claim 11, wherein each vane of the plurality of vanes includes an airfoil and a pair of pegs coupled to the airfoil, the airfoil having a pivot end, a trailing end spaced apart circumferentially from the pivot end, a first side surface that extends between and interconnects the pivot end and the trailing end and faces the gas path of the gas turbine engine, and a second side surface opposite the first side surface that extends between and interconnects the pivot end and the trailing end and faces the plenum, and the pair of pegs extend from the airfoil near the pivot end to the case to couple the respective vane to the case.

14. The gas turbine engine of claim 11, wherein the plurality of vanes includes a first set of vanes configured to pivot in a first direction about the pivot axis from the closed position to the open position and a second set of vanes configured to pivot in a second direction about the pivot axis opposite the first direction from the closed position to the open position.

15. The gas turbine engine of claim 14, wherein the first set of vanes are arranged in series and the second set of vanes are arranged in series spaced apart circumferentially from the first set of vanes.

16. The gas turbine engine of claim 14, wherein the first set of vanes are alternated circumferentially between the second set of vanes.

17. The gas turbine engine of claim 11, wherein the control unit includes at least one actuator coupled to the plurality of vanes and configured to drive movement of the plurality of vanes between the closed position and the fully open position and a controller coupled to the at least one actuator and configured to direct the at least one actuator to move the plurality of vanes to the closed position when the gas turbine engine is in a cruise condition included in the preselected operating conditions.

18. The gas turbine engine of claim 17, wherein the control unit further includes a memory coupled to the controller, the memory including a plurality of preprogrammed aircraft maneuvers that each correspond to one of the closed position and the fully open position, and wherein the controller is configured to detect a preprogrammed aircraft maneuver included in the plurality of preprogrammed aircraft maneuvers on the memory and direct the at least one actuator to move the plurality of vanes to a corresponding position in response to detecting the preprogrammed aircraft maneuver.

19. The gas turbine engine of claim 17, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the plurality of vanes to a corresponding position in response to the measurement of the at least one sensor.

20. A method comprising:
providing a fan case assembly adapted for use with a gas turbine engine, the fan case assembly including a case that extends circumferentially at least partway about an axis of the gas turbine engine and is formed to define a plenum that extends circumferentially at least partway about the axis and a plurality of vanes pivotably coupled to the case in the plenum to pivot about a pivot axis relative to the case,
locating the plurality of vanes in a closed position in which each vane covers a portion of the plenum to block fluid communication between the gas path and the plenum, and
pivoting the plurality of vanes to a fully open position in which each vane is at a maximum angle relative to a gas path of the gas turbine engine to provide an opening to allow fluid communication between the gas path of the gas turbine engine and the plenum in response to one preselected operating condition included in a plurality of preselected operating conditions.

* * * * *